US007698906B2

(12) United States Patent
Jarvis

(10) Patent No.: US 7,698,906 B2
(45) Date of Patent: Apr. 20, 2010

(54) SUB-WET BULB EVAPORATIVE CHILLER WITH PRE-COOLING OF INCOMING AIR FLOW

(75) Inventor: Eric Edward Jarvis, Boulder, CO (US)

(73) Assignee: Nexajoule, Inc., Boulder, CO (US)

( * ) Notice: Subject to any disclaimer, the term of this patent is extended or adjusted under 35 U.S.C. 154(b) by 458 days.

(21) Appl. No.: 11/616,303

(22) Filed: Dec. 27, 2006

(65) Prior Publication Data
US 2007/0151278 A1 Jul. 5, 2007

Related U.S. Application Data

(60) Provisional application No. 60/755,142, filed on Dec. 30, 2005, provisional application No. 60/800,682, filed on May 16, 2006.

(51) Int. Cl.
*F28D 5/00* (2006.01)
(52) U.S. Cl. .................. 62/311; 62/91; 62/310; 165/4
(58) Field of Classification Search .................. 62/93, 62/94, 310, 304, 477, 91, 309, 311
See application file for complete search history.

(56) References Cited

U.S. PATENT DOCUMENTS

| | | | | |
|---|---|---|---|---|
| 2,545,644 | A | * | 3/1951 | Benton et al. ............ 273/143 C |
| 4,380,910 | A | * | 4/1983 | Hood et al. ................... 62/91 |
| 4,952,283 | A | * | 8/1990 | Besik ............................ 165/4 |
| 5,692,384 | A | * | 12/1997 | Layton ........................... 62/91 |
| 5,746,650 | A | * | 5/1998 | Johnson et al. ............... 454/52 |
| 5,979,172 | A | | 11/1999 | Teller |
| 6,319,599 | B1 | * | 11/2001 | Buckley .................. 428/308.4 |
| 6,497,107 | B2 | | 12/2002 | Maisotsenko et al. |
| 6,502,807 | B1 | * | 1/2003 | Assaf et al. .............. 261/112.2 |
| 6,938,434 | B1 | | 9/2005 | Fair |
| 2003/0209017 | A1 | | 11/2003 | Maisotsenko et al. |
| 2005/0279115 | A1 | | 12/2005 | Lee et al. |
| 2006/0168981 | A1 | | 8/2006 | Mager et al. |
| 2006/0197241 | A1 | | 9/2006 | Brenneke et al. |

* cited by examiner

*Primary Examiner*—Frantz F Jules
*Assistant Examiner*—Emmanuel Duke
(74) *Attorney, Agent, or Firm*—Marsh Fischmann & Breyfogle LLP; Kent A. Lembke

(57) ABSTRACT

An evaporative chiller cooling water to below ambient wet bulb temperature. Sub-wet bulb chilling is achieved by precooling incoming air upstream of the saturator. The incoming air is ambient air at ambient air temperature that is cooled using the coolness of the lower temperature outgoing air exiting the saturator. The pre-cooling lowers the temperature of the incoming air and lowers its wet bulb temperature below that of ambient air. The saturator water is chilled to below the ambient wet bulb temperature. The air in the saturator flows across the water as it gravity drips or flows from the top to the bottom of the saturator. The pre-cooled air flows across the saturator with the coolest air directed across the bottom of the saturator where the coldest water is flowing and with the hottest air directed across the top where the hottest water is flowing to provide gradient chilling.

4 Claims, 11 Drawing Sheets

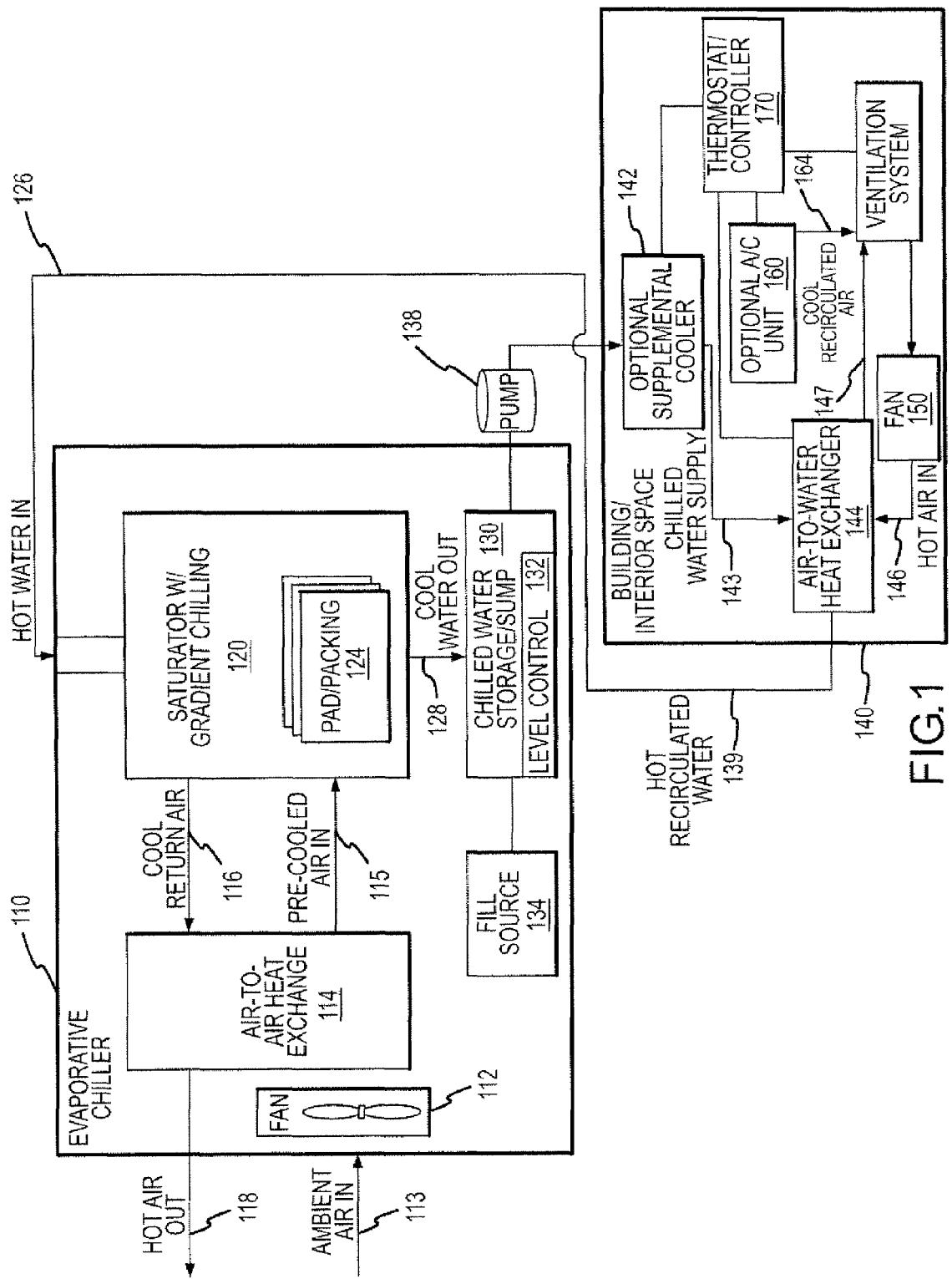

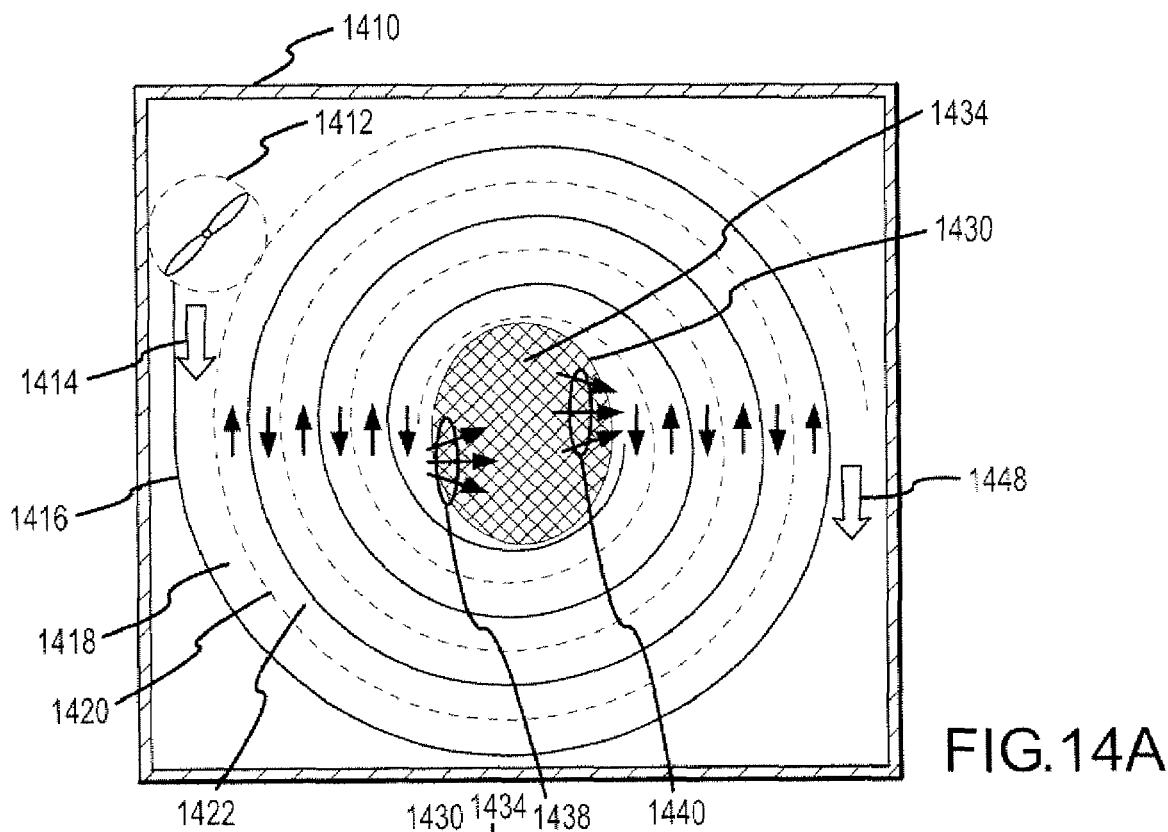
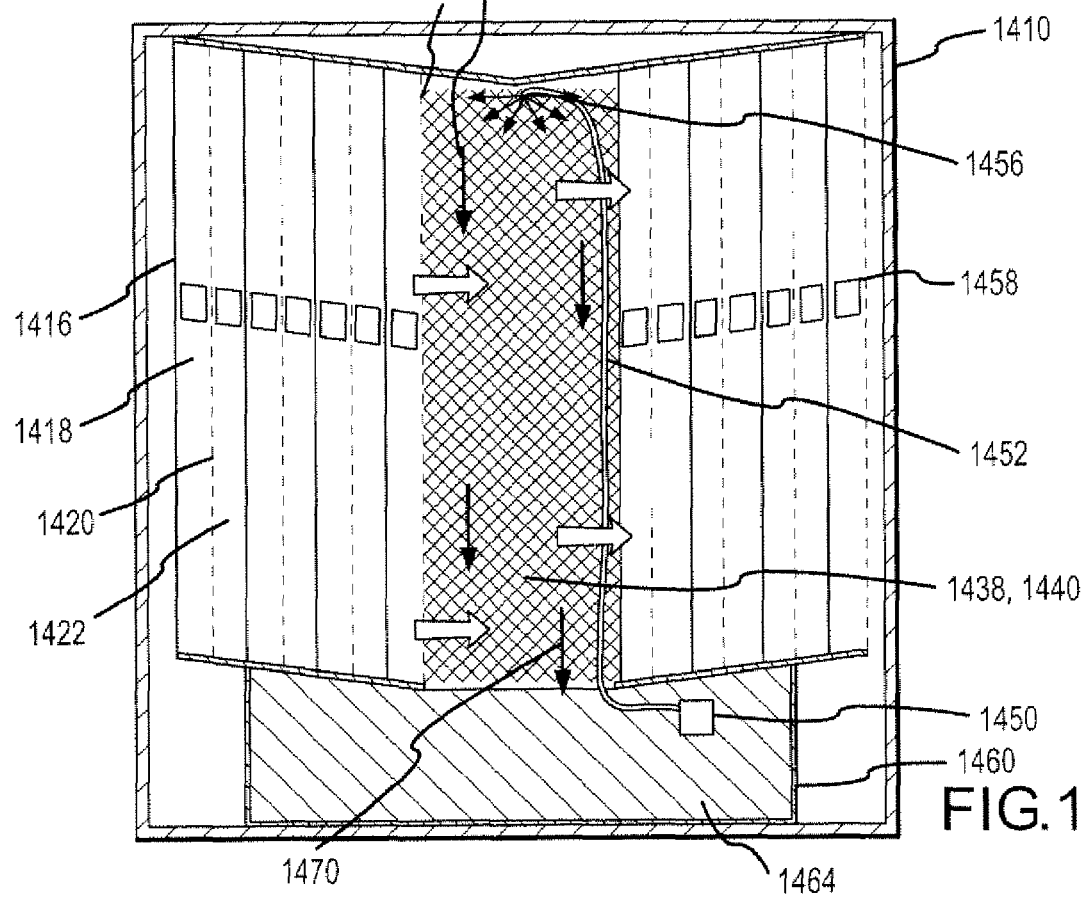

SUB-WET BULB EVAPORATIVE CHILLER WITH PRE-COOLING OF INCOMING AIR FLOW

CROSS-REFERENCE TO RELATED APPLICATIONS

This application claims the benefit of U.S. Provisional Applications No. 60/755,142 filed Dec. 30, 2005 and No. 60/800,682 filed May 16, 2006, which are incorporated herein by reference in their entirety.

BACKGROUND OF THE INVENTION

1. Field of the Invention

The present invention relates to evaporative chillers and evaporative cooling systems, and more particularly, to an evaporative water chiller or evaporative fluid cooling system that is operable to lower the temperature of water or other liquid exiting the chiller or chiller system to below the ambient wet-bulb temperature. This may be achieved by pre-cooling the incoming air flow or airstream to a temperature below the ambient air temperature such as by using the outgoing or exiting air flow or airstream.

2. Relevant Background

Today, a large fraction of the electrical energy used in the United States and elsewhere in the world is used for cooling interior spaces, such as habitated areas of residential and commercial buildings, to desired or acceptable temperatures. In some geographic regions, cooling costs may be more than half of the annual energy cost for businesses and home owners. The electrical energy used for space cooling is not only costly but causes problems because it is concentrated into certain times of the day when highest temperatures are experienced, and this high demand can create high peaks in power demand that are difficult for power companies to satisfy. Hence, there is an ongoing need for reducing the amount of energy needed for cooling and for better distributing the demand to reduce the size of spikes or peaks in demand. Reducing demand for electricity is a vital and growing concern as the human population increases, as more and more countries become industrialized and more urban, as concerns heighten over global warming from fossil fuel combustion, and as the availability of fossil fuels dwindles and the associated prices rise. One way to control electricity or power consumption is to develop lower-energy, alternative cooling systems that have the potential to reduce overall and peak electricity usage.

However, it has proven difficult to design cooling systems and devices that can effectively compete with refrigerant-based air conditioning (A/C) systems to significantly reduce overall power consumption. Evaporative coolers are one approach, but a number of disadvantages have blocked widespread use of these cooling systems. Evaporative cooling involves evaporation of a liquid to cool an object or a liquid in contact with an airstream. When considering water evaporating into air, the web bulb temperature of the ambient air (as compared with the dry bulb temperature) is a standard measure for the potential for evaporative cooling systems, and the greater the difference between the wet bulb and dry bulb temperatures the greater the possible evaporative cooling effect. Evaporative cooling is a fairly common form of cooling for buildings for thermal comfort since it is relatively cheap and requires less energy than many other forms of cooling. However, evaporative cooling requires a water source as an evaporative and is presently only efficient when the relative humidity is low, which has restricted its use to geographic regions with dry climates.

Smaller scale evaporative coolers are often called swamp coolers, and the typical swamp cooler passes an air stream from outside of the building or interior space through the swamp cooler to contact water or other liquid in the cooler. The air is cooled by evaporation of the water, and the cooled air is directed by fans into the building or interior space. Traditional evaporative or swamp coolers have met with a fair degree of market acceptance because they work well in arid and semi-arid regions and are inexpensive to purchase and operate. While such coolers can often provide most or all of the cooling needed for a home or business, they suffer from several disadvantages. Swamp coolers are generally incompatible for integration with compressor-based A/C because they are "pass-through" systems in which conditioned air must be allowed to flow out of the building. They also require large air flow rates, and may be noisy. Further, evaporative coolers in which the cooling air contacts the water may introduce mold and allergens into the interior of the building and often unacceptably raise the indoor humidity making it "muggy" in the building. Evaporative coolers also can require significant maintenance and often require winterization to avoid damage.

An alternative cooling system involves the use of an evaporative cooling system that functions by cooling a volume of liquid such as water by evaporating a portion of the cooling liquid in a stream of ambient or outdoor air. Such systems are referred to herein as "evaporative chillers." The cooled or chilled liquid is then circulated through piping of an air-to-water heat exchanger to cool the air blown or drawn through the exchanger. The air is cooled as heat is transferred to the water in the pipes and does not directly contact the water. The cooler air is returned to the interior spaces of the building. Evaporative chillers, which are also known as cooling towers, are more common in commercial buildings and can provide a large portion of the required cooling. Evaporative chillers are sometimes unable to lower the temperature of the interior space or building to an acceptable level, and in these cases, conventional compressor and refrigerant based air conditioning may be used to supplement the cooling achieved by evaporative cooling (however, this reduces the energy savings provided by use of the evaporative cooling system). When compared with swamp coolers and similar systems, evaporative chiller systems are compatible with compressor-based A/C units, do not introduce allergens or humidity to the cooling air (because there is no direct contact between indoor air and the chilled water), and do not require large air flow through the interior spaces of the building. In addition, evaporative chillers integrate well with typical HVAC practices in that the location of the chiller unit is flexible and existing ductwork can be utilized. Evaporative chillers are also compatible with radiant cooling technologies that are gaining acceptance in some areas.

Even in light of these advantages, evaporative chillers have not been widely used for cooling in the residential market. There are at least two main reasons that evaporative chillers are not attractive to home owners and residential builders. Depending on the wet bulb temperature, evaporative chillers often will not be able to cool the flowing coolant or water to a low enough temperature to effectively cool a building or interior space. Evaporative chillers may be seen as an unnecessary expense or an expense that will require many years to recoup based on potential energy savings. The costs associated with an evaporative chiller may be particularly unpalatable if a backup A/C system is still required to handle higher loads or to cool on hotter days. Thus, the ability of an evaporative chiller to more effectively lower the water temperature relative to the ambient wet bulb temperature is key to the success of such cooling systems.

Two-stage evaporative coolers have also been developed. These units combine both an indirect and a direct evaporative cooling stage to generate air that can sometimes reach the ambient wet bulb temperature or below. This is achieved by lowering the wet bulb temperature of the ambient air by first passing it through the indirect stage (in which no humidity is added). The second, direct evaporative cooling stage adds humidity and further reduces the air temperature. Lower air temperatures mean that these coolers can provide the required level of cooling under a wider range of ambient conditions and geographical areas than typical swamp coolers. Unfortunately, because these two-stage coolers still produce chilled air (rather than water) many of the disadvantages of swamp coolers still apply. This, along with the complexity and cost of two-stage coolers, has prevented their rapid market penetration. In theory, the two-stage designs could be adapted to produce water rather than air (by utilizing the water in the sump). Besides the cost and complexity factors, this approach has at least two disadvantages compared to the system described in the present invention. First, the two-stage cooler used as a water chiller will exhaust cooled air to the ambient environment, thus wasting cooling power and increasing water consumption. Second, the theoretical temperature to which water can be cooled is not as low as in the present invention. That is because the first (indirect) stage can only reduce the air temperature to the ambient wet bulb temperature (and typically higher in practice), whereas in the present invention the use of cooled exhaust air to cool the incoming air makes possible pre-cooling air to below the wet bulb temperature. Others have described chiller designs based on recycling exhaust air from the chiller to pre-cool incoming air. However, those designs do not take advantage of the "gradient chilling" concept of the present invention (explained below) that allows further reduction of water temperatures.

Hence, there remains a need for cooling systems that are more energy efficient and preferably that more effectively implement evaporative cooling to cool buildings or interior spaces within a residence or commercial structure. Preferably, such cooling systems would include an evaporative chiller that is designed to provide improved levels of cooling with low energy consumption and that would be adapted for use in the residential or housing market as well as in commercial settings.

SUMMARY OF THE INVENTION

The invention provides an evaporative chiller (sometimes referred to as a cooling tower even in smaller residential models) that can cool water to temperatures below the ambient wet bulb temperature. This ability sets the evaporative chillers of the invention apart from traditional cooling towers that are limited to cooling water to the wet bulb temperature of the ambient air. Sub-wet bulb chilling is achieved by pre-cooling the air to be used for cooling the water in the saturator (e.g., where water is allowed to flow over packing, pads, or the like and be evaporated to obtain chilling). This inlet or incoming air is typically the air surrounding the chiller or ambient air at ambient air temperature. The incoming air in some embodiments of the invention is cooled using the coolness of the lower temperature outlet or outgoing air that has passed through the saturator. The pre-cooling acts to lower the temperature of the incoming air and, thus, to lower its wet bulb temperature below that of the ambient air. As a result, the water in the saturator can be chilled to a lower temperature and, typically, a temperature below the ambient wet bulb temperature. To further enhance the chilling effect, the air in the saturator is directed to flow across the flow path of the water as it gravity drips or flows from the top to the bottom of the saturator or saturator column (e.g., to have a cross-flow path rather than counter-current as is used typically in conventional cooling towers). Yet further, the pre-cooled air is directed across the saturator so as to have a range of temperatures with the coolest air directed across the bottom of the saturator where the coldest water is flowing and with the hottest air directed across the top of the saturator where the hottest water is flowing. This is achieved by maintaining the vertical temperature stratification of the incoming and outgoing air streams such that the coldest outgoing air at the bottom is used to pre-cool the incoming air at the bottom of the device, and the hottest outgoing air at the top is used to pre-cool the incoming air at the top of the device. Thus, a temperature gradient is established which we will refer to as "gradient chilling." Gradient chilling functions to chill the water more effectively and to achieve a lower final water temperature.

More particularly, an evaporative chiller is provided that includes a saturator and a mechanism for delivering a volume of air to the saturator at temperatures below the ambient air temperature outside the chiller. The saturator includes a liquid inlet and a liquid outlet (e.g., into a sump) and liquid to be cooled or chilled enters through the liquid inlet and is fed by gravity vertically downward to exit through the liquid outlet. To chill this flowing liquid, the air delivered to the saturator is forced to flow transversely across the flowing water and is provided with a temperature gradient (i.e., at a first temperature near the water inlet and at a second lower temperature near the water outlet and increasing between the outlet and the inlet gradually). The air delivery mechanism typically includes a fan or fans for forcing the air into the chiller, through the saturator, and back out of the chiller.

Six embodiments of the invention are presented that share the basic principles of chilling water to sub-wet bulb temperatures, transverse flow in the saturator, and gradient chilling, but differ in the nature and design of the heat exchanger that utilizes outgoing air to pre-cool the incoming air. In one embodiment, a first thermal storage matrix is positioned along a first side of the saturator, a second thermal storage matrix along a second opposite side of the saturator, and the fan(s) has its direction reversed periodically such that incoming ambient air alternates between flowing over the first and second thermal storage matrices prior to entering the saturator such that the incoming air is pre-cooled as it flows through the matrices. In another embodiment, the air delivering mechanism includes a first air-to-liquid heat exchanger positioned upstream the saturator air inlet, a second liquid-to-air heat exchanger positioned downstream of the saturator air outlet, and a pump that circulates liquid through the liquid side of these two heat exchangers, which results in pre-cooling of the air fed to the saturator (again with "gradient chilling").

In some preferred embodiments, the air delivering mechanism is formed to provide an air-to-air heat exchanger upstream of the saturator to use air exiting the saturator to pre-cool the incoming ambient air. For example, the chiller may include a cabinet defining an interior space and the saturator may be positioned at one end of this interior space. The air delivering mechanism then may include a plurality of spaced-apart, parallel tubes that extend horizontally within the cabinet's interior space with one end extending to or into the saturator but spaced apart from the cabinet side wall to provide a space for incoming air to flow through the space between the tubes, through the saturator, through the gap between the tube ends and the cabinet side wall, and into the tube ends to be directed out of the cabinet but first cooling the incoming air. In other examples, vertical or horizontal, parallel plates may be used to define side-by-side incoming and outgoing airstream channels or passageways upstream of the saturator (and sometimes the saturator material may be provided within the outgoing (or incoming) passageways. In other applications, plates are again used (such as thin metal sheets) but in these cases the plates are wound about the saturator to define spiral flow paths for the incoming and outgoing airstreams. In each of these embodiments, the incoming and outgoing air generally does not mix extensively in the vertical dimension (i.e., remains stratified) and is provided to the saturator with a temperature gradient with the cooler air being fed into the bottom of the saturator to further cool the already chilled water and the hotter air (but still pre-cooled to a temperature below ambient) fed to the upper or inlet portions of the saturator in which the water is also warmer.

BRIEF DESCRIPTION OF THE DRAWINGS

FIG. 1 is a functional block diagram of a cooling system including a sub-wet bulb evaporative chiller according to the present invention;

FIGS. 14A and 14B illustrate sectional top and side views, respectively, of still another embodiment of an evaporative chiller of the present invention that shows the use of side-by-side, spirally wound plates for defining flow channels for inlet and outlet/return air to provide pre-cooling of the inlet air prior to its reaching a centrally positioned saturator.

DETAILED DESCRIPTION OF THE PREFERRED EMBODIMENTS

Figure 2A:
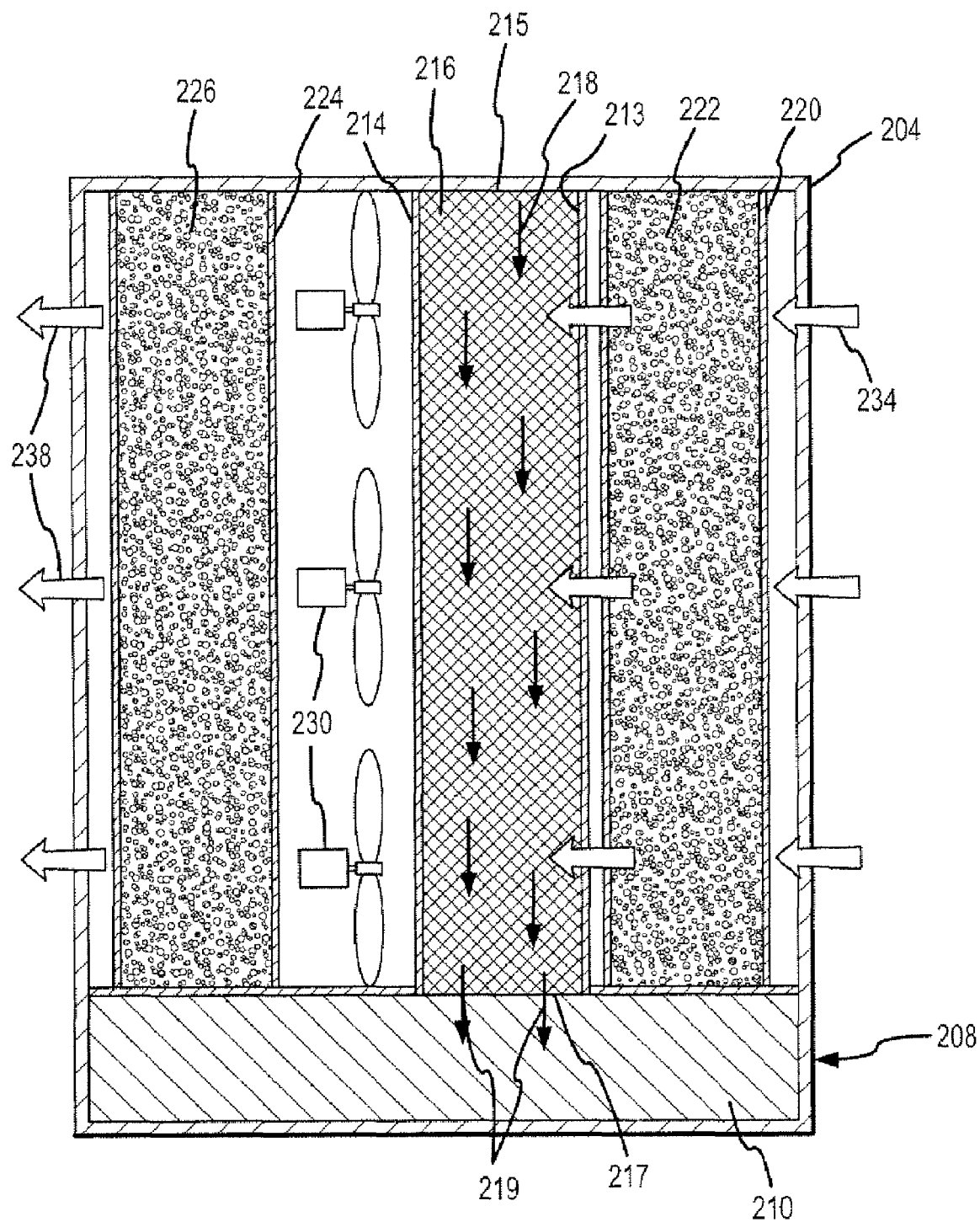
FIGS. 2A and 2B are sectional side views of one embodiment of an evaporative chiller of the invention that is useful in cooling systems such as the system of FIG. 1 and that shows the use of reversible air flow and cooling storage matrices to obtain sub-wet bulb temperature cooling.

In the drawings, like reference numerals indicate like features, and a reference numeral appearing in more than one figure refers to the same element. The drawings and the following detailed descriptions show specific embodiments of the invention with numerous specific details including materials, dimensions, and products being provided to facilitate explanation and understanding of the invention. However, it will be obvious to one skilled in the art that the present invention may be practiced without these specific details and these broader embodiments of the invention are considered within the breadth of the following claims.

The present invention is generally directed at evaporative chillers and cooling systems that include such evaporative chillers (such as residential and commercial cooling systems). The evaporative chillers of the present invention are unique for at least two reasons. First, the chillers are designed to pre-cool the incoming air flow from the ambient temperature to a lower temperature prior to its entering the saturator and contacting the liquid to be chilled (e.g., water in many embodiments but other liquids may be utilized to practice the invention). This pre-cooling phase is generally achieved with a heat exchanger in which the hot gas is the incoming or inlet ambient air (or other gas in some embodiments) and the cold gas is the outlet or return air that has passed through and been cooled in the saturator. Second, the chillers are designed to provide gradient chilling in the saturator, e.g., the highest temperature water toward the top of the saturator is cooled by air at a first temperature and the coolest temperature water toward the bottom of the saturator is cooled by air at a second temperature, with the second temperature being significantly lower than the first temperature and water or liquid flowing between the top and bottom of the saturator or water column will generally decrease in temperature from the top to the bottom to provide a desired gradient (or, more accurately, the higher enthalpy water enters at the top and the lower enthalpy water exits at the bottom with an enthalpy gradient between). Generally, the cooling air is also directed transversely and, in many cases, orthogonally across the path of the flowing water in the saturator to establish a cross-flow pattern rather than a counter-current flow as is used in many conventional chillers.

Before discussing specific implementations of chillers and cooling systems, it may be useful to provide further general discussion of these two features of the invention. In most versions of the invention, saturator cross-flow and gradient chilling are provided. The water in the saturator moves vertically downward under the force of gravity while the air stream is moved by one or more fans or blowers horizontally through the saturator (e.g., in cross-flow or transverse direction relative to the water stream or water flow direction). This is unlike many cooling towers in which the water and air flows are directly opposite or counter-current. The cross-flow pattern allows chillers of the invention to establish and maintain a vertical temperature gradient (e.g., to provide gradient chilling). The water stream or inlet water enters the top of the saturator at an elevated temperature because, for example, the water has gained enthalpy after passing through a heat exchanger in a residential or commercial building or interior space that is being cooled by use of the chiller (or a system including the chiller). As the water passes down through the saturator over packing and/or pads, the enthalpy of the water decreases as heat is given up as latent heat in the passing airstream through evaporative cooling (e.g., an enthalpy gradient exists in the water in the saturator that decreases from the top to the bottom of the saturator).

The air passing through the saturator is also cooled by the evaporative cooling in the saturator, and the air passing through the saturator near the bottom of the saturator is cooled to a lower temperature than the air passing through near the top of the saturator because of the range or gradient of the temperature and enthalpy of the water in the saturator (e.g., due to the higher temperature of the water near the inlet to the saturator as compared to the temperature of the water near the outlet of the saturator). The air being drawn into or blown into the chiller or incoming air is pre-cooled indirectly (or without direct contact) by the outgoing air (e.g., in a heat exchanger and, in some cases, in the saturator itself). An important part of each heat exchanger design, as described below, is that the air mixes relatively little in the vertical direction or dimension. This lack of mixing is typically maintained for both the incoming air and the outgoing air, and it is used and maintained so that the warmest (or highest enthalpy) water and incoming/outgoing airstreams (i.e., after pre-cooling) are located at the top of the chiller and saturator while the coolest (or lowest enthalpy) water and incoming/outgoing airstreams are located at the bottom of the chiller and saturator. In this description, this variation of temperatures vertically in the chiller and saturator is labeled "gradient chilling" or "vertical chilling gradient" or the like.

Figures 10, 11:
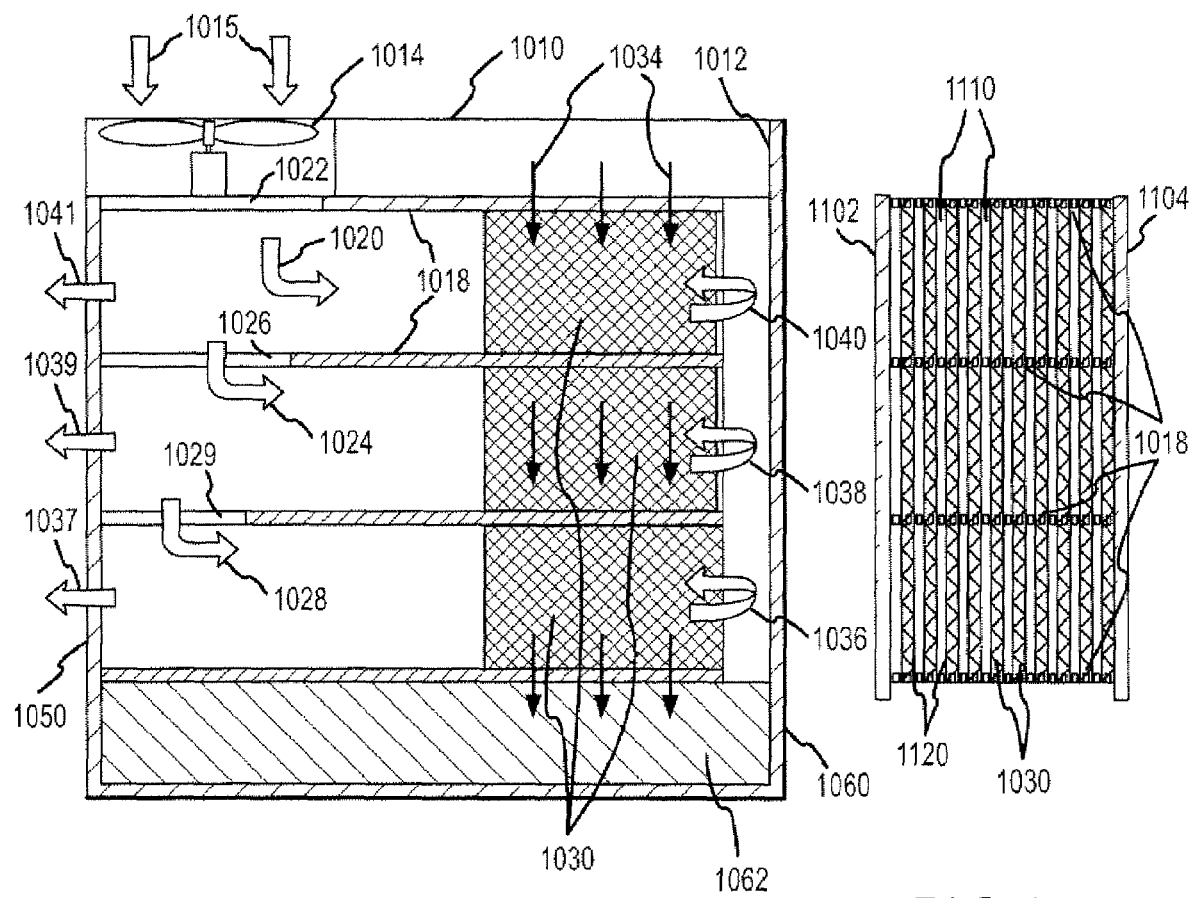
FIG. 10 is a sectional or cutaway side view of another embodiment of an evaporative chiller of the invention that pre-cools incoming or inlet air upstream of the saturator or water column using vertical plates and spacers to provide flow channels.
FIG. 11 is a sectional side view of the chiller showing the positioning of saturator pads/packing in return flow channels.

Pre-cooling of the incoming air is an important aspect of the invention, and this is achieved generally with a heat exchanger that is placed between the inlet of the ambient air and the saturator (or is provided in part in the saturator in some cases such as the plate arrangement of FIGS. 10 and 11). Generally, the heat exchanger is an air-to-air configuration in which the incoming ambient air transfers some amount of heat to the outgoing air but at least one embodiment involves using the air exiting the saturator to cool a different medium (such as a liquid flowing in piping or tubes or material in a cooling matrix) that is positioned in the path of the incoming air (e.g., upstream of the saturator air inlet). The heat exchange in air-to-air embodiments is typically achieved in a counter-current manner so as to maximize the efficiency and completeness of the heat transfer. The heat exchanger configurations may vary as is shown in the supporting figures and described herein but the designs are all generally adapted to reduce the wet bulb temperature of the air being fed into the saturator when compared with the ambient air being blown or drawn through the chiller. As a result, all or most designs of chillers described in the following paragraphs may be thought of as a sub-wet bulb temperature evaporative chiller. In addition to being able to produce chilled water at a temperature below the ambient wet bulb temperature, the chiller designs are typically selected to provide efficient heat exchange, to be relatively compact, and to be inexpensive to fabricate, install, and maintain.

FIG. 1 illustrates one embodiment of a cooling system 100 that may be used to cool or condition an interior space or building (residential or commercial) 140. The system 100 is shown to include an evaporative chiller 110 that may be configured as described above as a sub-wet bulb temperature evaporative chiller. In this regard, the chiller 110 includes a fan or fans 112 for moving ambient air 113 into the chiller 110. The fan(s) 112 may be positioned as shown to blow or force the air 113 through the components of the chiller or, in some cases, it may be positioned to draw the air 113 through the chiller 110 (e.g., be positioned at the outlet of the chiller 110) or be positioned within the chiller 110 (or fans may be positioned in any combination of these positions).

The chiller 110 includes a heat exchanger 114 and a saturator 120 with the heat exchanger 114 being positioned upstream of the saturator inlet. As a result, the ambient air 113 is cooled to produce pre-cooled air 115 that is fed to the inlet of the saturator 120. Generally, this "pre-cooling" is achieved by using the cool return air 116 exiting the outlet of the saturator 120 after passing over and/or through the pads/packing 124 of the saturator 120. Thus, the exiting air 116 is typically at a lower temperature than the ambient air 113 and the heat exchanger 114 makes use of this temperature differential to obtain efficient heat transfer. The exchanger 114 outputs the pre-cooled air 115 that has a lower temperature and lower wet bulb temperature than the ambient air 113 fed into the chiller 110 and outputs air 118 after it has passed through the heat exchanger 114. The heat exchanger 114 may take many forms to practice the invention as shown in FIGS. 2A-14B, with the air-to-air heat exchanger shown being one useful example that is explained in more detail with reference to FIGS. 7-14B.

Water to be cooled 126 (e.g., that has a raised enthalpy due to its use for cooling the building 140) is fed into a water inlet of the saturator 120. The inlet is generally at the top of the saturator 120 and the water 126 is allowed to gravity feed or drain over the pads/packing 124 where it is contacted by pre-cooled air 115 from the heat exchanger 114. The saturator 120 is configured for gradient chilling as described above with the highest temperature/enthalpy water 126 being at the top of the saturator 120 along with the highest temperature portion of the pre-cooled air in 115 and the chilled or cooler water (e.g., lower enthalpy water) 128 being near the bottom of the saturator 120 or near the water outlet of the saturator 120 along with the coolest portion of the pre-cooled air 115. The gradient for the water in the saturator 120 is obtained due to feeding the hot water 126 in at the top of the saturator 120 and using gravity for flow, but the gradient in the pre-cooled air 115 fed into the saturator 120 is achieved by the special configuration of the heat exchanger 114 (and, in some cases, positioning or arrangement of the saturator 120). The particular configuration of heat exchangers, such as exchanger 114, to obtain the chilling gradient with the pre-cooled air 115 is described in detailed with reference to FIGS. 2A-14B.

Returning to the system 100 of FIG. 1, the chilled or cooled water 128 is fed into a sump or to a chilled water storage 130. A level control 132 may be used to determine when water from a fill source 134 should be added to maintain a preset volume of water in the system 100 (or simply in the sump or storage tank 130). One or more pumps 138 and associated piping, valves, and other plumbing components are provided to allow the chilled water in the storage or sump 130 to be used to cool or condition the building or interior space 140. In some applications, it may be desirable to further reduce the temperature of the water 128 exiting the chiller 120 such as when the wet bulb temperature of the pre-cooled air 115 is not low enough to provide desired cooling to the building 140. In these cases, an optional supplemental cooler 142 may be provided to further cool the water 128 prior to its use for cooling the building 140. Alternatively, a cooling coil or other technique may be used to reduce the temperature of the water in the storage or sump 130 to lower the temperature of the chilled water supply 143.

The chilled water supply 143 is then used to cool the space 140 such as by passing the chilled water supply 143 through the liquid or tube side of air-to-water heat exchanger 144 as shown. The hot recirculation water 139 is then returned via piping to the chiller 110 as shown at 126. A fan 150 is used to provide air 146 that flows through the exchanger 144 and is cooled by the chilled water 143. The cooled air 147 is recirculated via a ventilation system 148 to the interior space 140. In some cases, the heat exchanger 144 may not provide adequate cooling capacity for the space 140, and a conventional or other cooler such as a compressor-based A/C unit 160 may be used to supplement the heat exchanger 144. Conventional thermostat(s) and/or controller(s) 170 typically are provided as part of the cooling system 100 to control operation of the exchanger 144 (such as by controlling the ventilation system and fan 150 and/or by controlling the volume of chilled water supply 143 and operation of the optional supplemental cooler 142). Although not shown, control equipment often is provided with the chiller 110 to control its operation such as by selectively operating the fan (e.g., on/off, direction, speed, and the like), operating refill pumps associated with source 134 and level control 132, controlling flow of water 126 into the saturator 120, or operating louvers or other devices limiting flow through fan 112 to set volume and/or rate of air in and out 113, 118.

Alternative configurations of pumps and piping may be advantageous. For example, it may be desirable to separate the water loop used in the chiller 110 from the water used in the cooling system of the interior space 140, so as to reduce oxygen and contaminant levels in the interior water and thereby slow the rate of corrosion in the air-to-water heat exchanger 144. This can be achieved by pumping chilled water with pump 138 into one side of a counter-current water-to-water heat exchanger and into pipe 126 to the top of the saturator 120. A second pump is placed to pump water from the air-to-water heat exchanger 144 into the second side of the water-to-water heat exchanger and back to the optional supplemental cooler 142, thus creating two separate water flow loops. A second alternative configuration would place the optional supplemental cooler 142 within the chiller 110 rather than in the interior space 140. A third alternative configuration would separate the water flow through the saturator 120 from the water flow through the interior space 140. This would be particularly useful, for example, when a large volume of chilled water storage 130 is employed. One pump moves water from the top of the storage vessel 130 to the top of the saturator pad/packing 124, the chilled water then being allowed to drain 128 or be pumped through a pipe leading to the bottom of the storage vessel 130. Chilled water for cooling the interior space 140 is pumped from the bottom of the storage vessel 130, and hot water returning from the air-to-water heat exchanger 144 is piped to the top of the storage vessel 130. Thus, a thermal gradient will form in the storage vessel 130 such that the warmer water is at the top. Separating the saturator loop from the interior space cooling loop allows the chiller 110 to operate and accumulate chilled water independent of the demand for cooling in the interior space 140. This would facilitate chilling of stored water at night to utilize off-peak power, utilize cooler nighttime wet-bulb temperatures, and allow downsizing of the chiller 110. Many other configurations of the system components are possible and would be apparent to those skilled in the art.

In one preferred embodiment, pre-cooling of incoming air is achieved through the use of a thermal storage medium to indirectly cool the ambient incoming air using the air exiting the saturator. For example, the heat exchanger 114 of FIG. 1 may be formed to include a thermal storage medium that is cooled by the exiting air and then the incoming air is passed over/through the storage medium (e.g., the exiting air is used to cool the thermal storage medium which is, in turn, used to cool the incoming air rather than utilizing a more direct heat exchange as found in air-to-air exchangers). FIG. 2A illustrates one embodiment of an evaporative chiller 200 utilizing thermal storage media to pre-cool inlet air before it is fed to a saturator. The chiller 200 is also adapted to maintain a chilling gradient to enhance heat transfer efficiency.

The chiller 200 is typically placed in a frame or outer structure 204 that may, for example, include a floor, side walls, and a roof/top that are formed from metal (e.g., sheet metal), plastic, or wood and includes louvers or other openings to allow air to flow into the sides or sidewalls. Additionally, insulation may be provided in some or all the sides or walls of the structure 204 to reduce the amount of heat that enters the chiller 200. The structure 204 is shown to define a sump 208 in which chilled water 210 is stored (e.g., a storage tank or basin for receiving chilled water 219 that has flowed through the saturator 214). In other embodiments, the chilled water 219 may be directed via the sump 208 and/or piping to a storage tank for storing larger volumes of chilled water 219 for use in a cooling system.

The chiller 200 includes a saturator 214 defined by a side wall 213 and packing or pads 216. For example, the side wall 213 may be a porous sheet of metal, plastic, or the like or a wire or mesh sheet in which packing or one or more saturator pads 216 are positioned or supported. During operation, hot or higher enthalpy water 218 enters the top 215 of the saturator 214 and flows down over the pad/packing 216 to the bottom 217 of the saturator where the chilled or lower enthalpy water 219 exits the saturator and is discharged into the sump 208. The saturator walls 213 and pads 216 may define a rectangular volume as shown or may have differing shapes and/or cross sections (e.g., side facing incoming air 234). The chiller 200 further includes one or more fans 230 that are selected to be reversible so as to draw ambient air 234 into the chiller 200 from the right side of the chiller 200 as shown and discharge hot air 238 out the left side of the chiller 200 as shown in FIG. 2A in a first operating mode. In a second operating mode shown in FIG. 2B, the fans draw ambient air 244 into the chiller from the left side of the chiller 200 to flow through the saturator walls 213 and pads 216 to be discharged as hotter air 248 from the right side of the chiller 200. The chiller 200 includes two or more thermal storage matrices 224, 220 defined by side walls (e.g., screen, mesh, or other retaining structure that also allows air to flow through the matrix) and a storage medium 222, 226 that is positioned within the side walls. As shown, a single matrix 220 is provided on one side of the saturator and a single matrix 224 is provided on the second or other side of the saturator such that air flowing horizontally or cross-current through the saturator is forced to flow through a matrix 220, 224 on the inlet and on the outlet sides of the saturator. Of course, the number of matrices and their sizes, shapes, and materials may be varied to practice the invention with one example being shown for simplicity of explanation and as one useful but only exemplary embodiment of the invention.

Figure 2B:
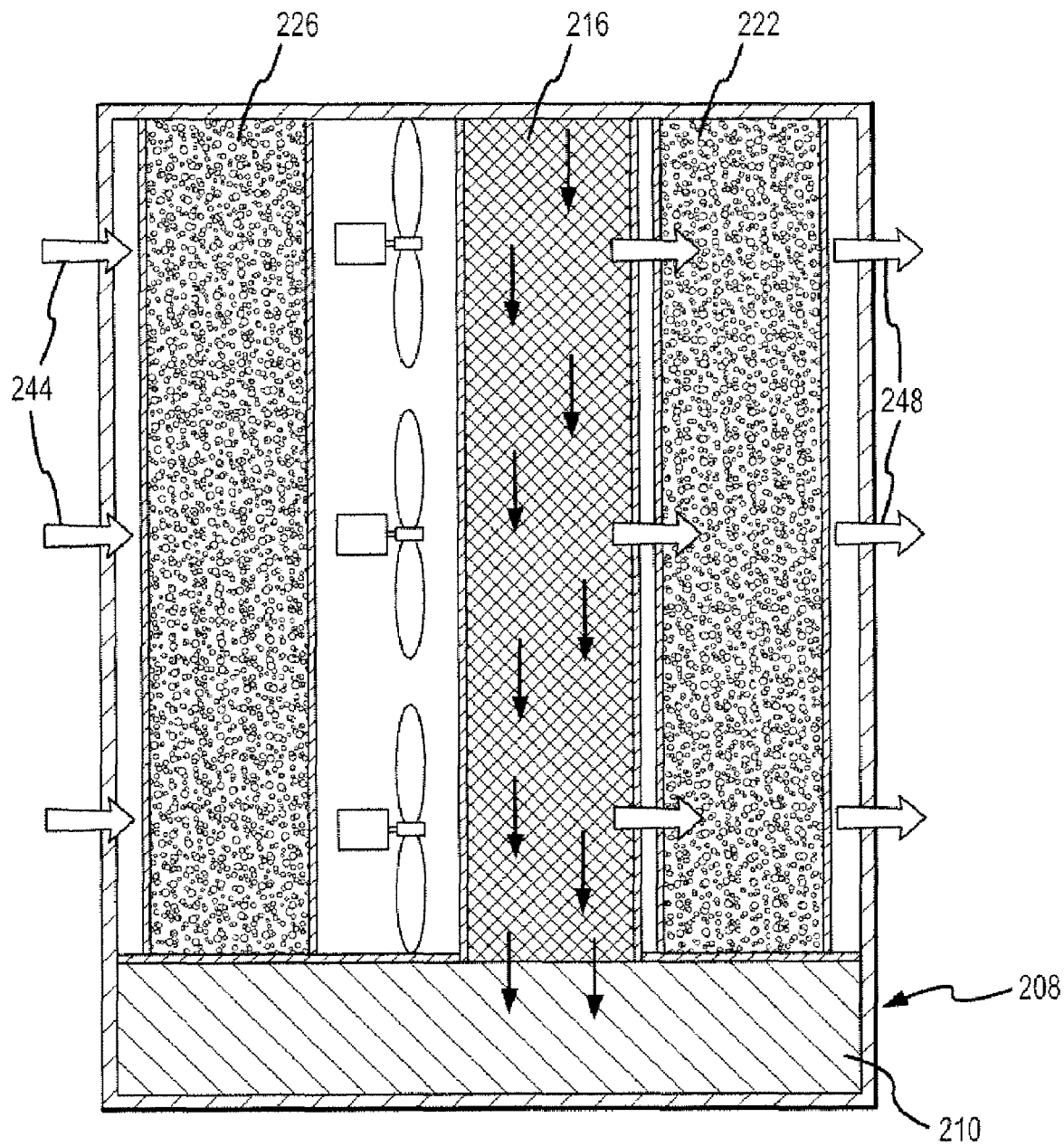

As can be seen in FIGS. 2A and 2B, the chiller 200 in general includes four components: (a) a bank 224 of thermal storage material or media 226 that is chosen to be or is arranged to be permeable to air flow; (b) a set (one or more) of reversible and, typically, low power fans 230; (c) a saturator 214 in which water 218, 219 flows from top 215 to bottom 217 through a medium 216 such as a conventional saturator pad or fibrous packing; and (d) a second bank 220 of thermal storage material or media 222. The banks 220, 224 may have the same or differing configurations, e.g., cross sectional shape, thickness, wall material, and the like, and the media 222, 226 may be similar or identical, but in other embodiments, the two thermal storage banks or matrices may differ such as by using different thermal storage material or the like.

With reference to FIGS. 2A and 2B, the principle of operation of the chiller 200 is a temporal separation of thermal capture and removal from each thermal storage bank 220, 224 mediated by periodic reversal of the fans 230. For example, during operation of the chiller 200, the fans 230 may first operate as shown in FIG. 2B to force ambient air 244 from the left side of the structure 204 through the left (or first) storage bank 224 and its storage material 226. The air would then flow through the saturator pad(s) 216 where the air gains humidity and is cooled, and this cooled and exiting air 248 is forced through the storage material 222 of the right or second storage bank 220 prior to exiting the chiller structure 204. The air 248 exiting the saturator 214 is cooled resulting from passing through the saturator pad 216 and water 218, 219, and at least a portion of the "coolness" of this air 248 decreases the temperature of the storage material 222 of the right side matrix or bank 220, i.e., a heat transfer occurs due to a temperature difference between the material 222 and the air 248. The chiller 200 may be operated for a period of time in the direction shown in FIG. 2B so as to lower the temperature of the material 222 in the matrix or bank 220.

Then, after a period of time (e.g., a few minutes or more depending upon the thermal capacity of the storage matrix 220, the heat transfer rate, and other factors), the fans 230 are reversed to the mode shown in FIG. 2A. As shown, the ambient air 234 is drawn in on the right-hand side of the structure 204. The incoming ambient air 234 is first cooled or pre-cooled as it passes through the storage matrix 220 and contacts the thermal storage media or material 222. Generally, this heat exchange occurs without adding moisture to the ambient air 234. This reduction in the ambient air 234 temperature results in air leaving the bank 220 and entering the saturator 214 that is at a lower temperature (e.g., at a temperature below ambient temperature). Thus, the wet bulb temperature of the air entering the saturator 214 and pad/packing 216 is lower than the ambient wet bulb temperature. During heat transfer in the saturator 214, moisture is added to the air, and its temperature drops even further to a temperature that may ideally be below the wet bulb temperature of the ambient air 234. The temperature of the water 218, 219 stream flowing in/over the saturator pad/packing 216 drops from the top 215 to the bottom 217 and typically to a point below the ambient wet bulb temperature. The water in the sump 210 is then distributed to air-to-water or other heat exchangers in a cooling system to cool a residence or other space as discussed with reference to FIG. 1. The cooled air is then passed through the left-hand bank 224 and its thermal storage media or material 226, cooling the temperature of this material 226 prior to exiting at 238 through the outlet of the structure 204. The material 226 is placed at a temperature below ambient air temperatures such that when the fans 230 are again reversed the material 226 is useful for pre-cooling the incoming ambient air 244 shown in FIG. 2B.

The cycling of the fans 230 may be performed on some pre-set periodic basis (e.g., a number of minutes selected from the range of 2 to 30 or more minutes) or may be controlled based on temperature sensors placed in the air stream (e.g., outlet of a matrix 220, 224) and/or in or on the storage material 222, 226 (e.g., to determine when a previously determined temperature below ambient is achieved or other control parameter is determined). Electronic controls provided for the chiller 200 typically would include those useful for periodically alternating the direction of fans 230, which may be achieved via reversible motors or a mechanism for physically rotating the fans 230 to alter their direction. For example, the motors of the fans 230 may be electronically commutated motors that typically have good efficiencies. The ability to control the speed of the fans 230 (and other fans of other chiller embodiments) may be provided for in the electronic controls to maximize or at least improve the efficient operation of the chiller 200 such as adjusting speed based on cooling load/demand. The power of the fans 230 generally is selected based on the size of the chiller 200, the pressure drop through the storage banks 220, 224 and saturator, and the desired air flow. It is anticipated that relatively low power or low wattage fans will be adequate for many chiller 200 configurations.

The gradient cooling of the incoming airstreams 234, 244 to pre-cool the air input to the saturator in the chiller 200 is similar to counter-current air-to-air heat exchangers of the invention. This gradient cooling of the incoming streams 234, 244 in the matrices 220, 224 results in enhanced heat transfer in the saturator, which contains water that decreases in temperature (and/or enthalpy) from the water 218 near the top or water inlet 215 of the saturator column to the water 219 near the bottom or water outlet 217 of the saturator column. This combination provided gradient chilling in the chiller 200.

Figure 3A:
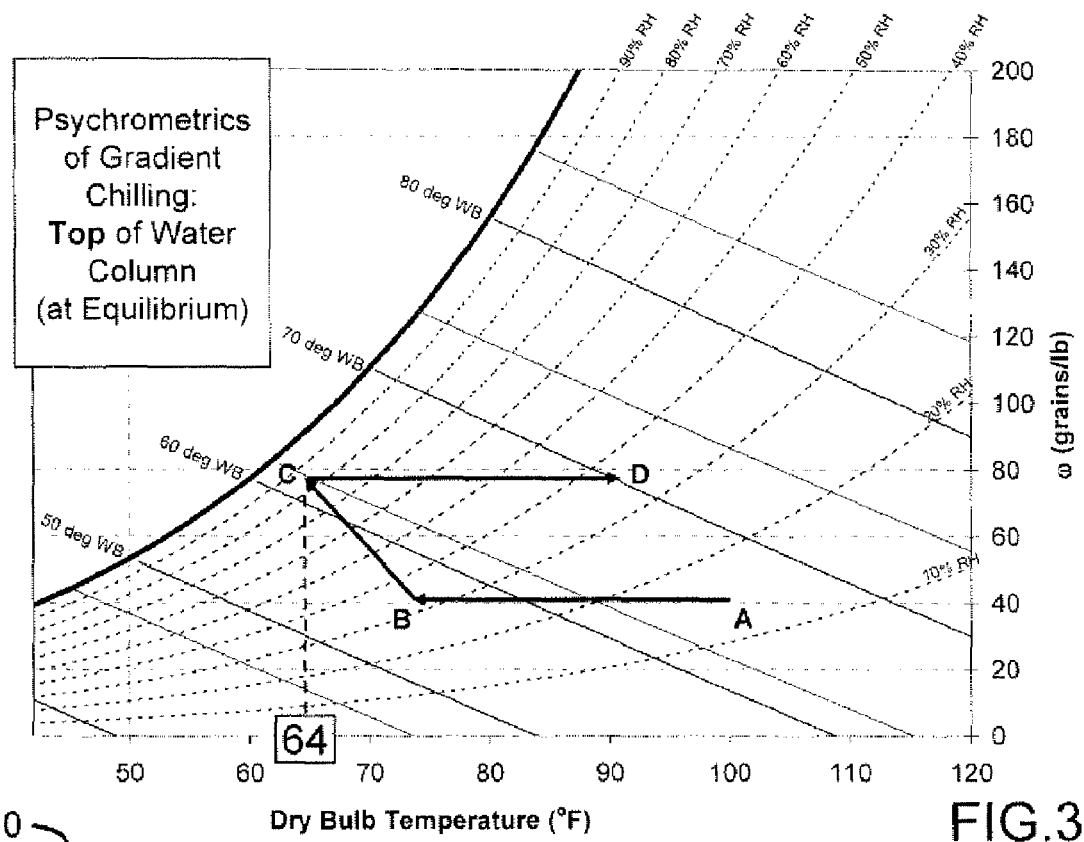
FIGS. 3A and 3B are graphs showing theoretical examples of the psychometrics of the air flowing at the top and bottom, respectively, of an evaporative chiller of the invention that utilizes gradient chilling.
Figure 3B:
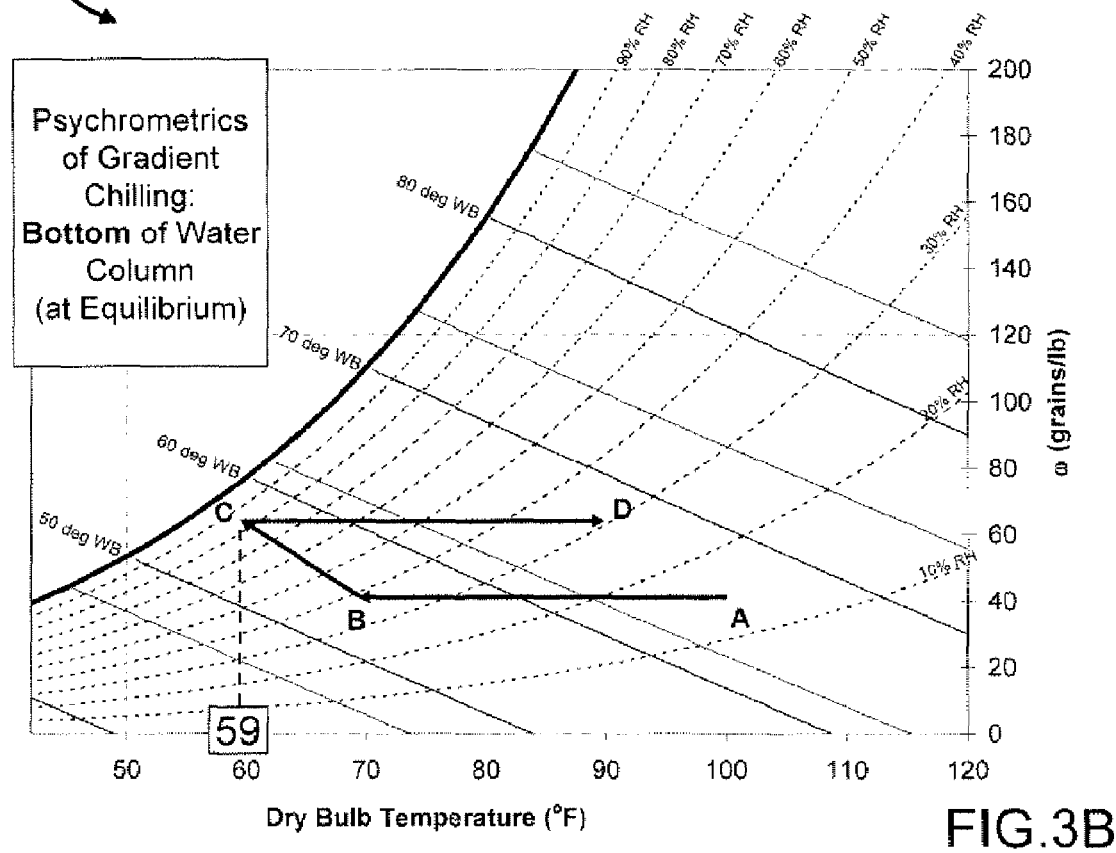
Figure 5:
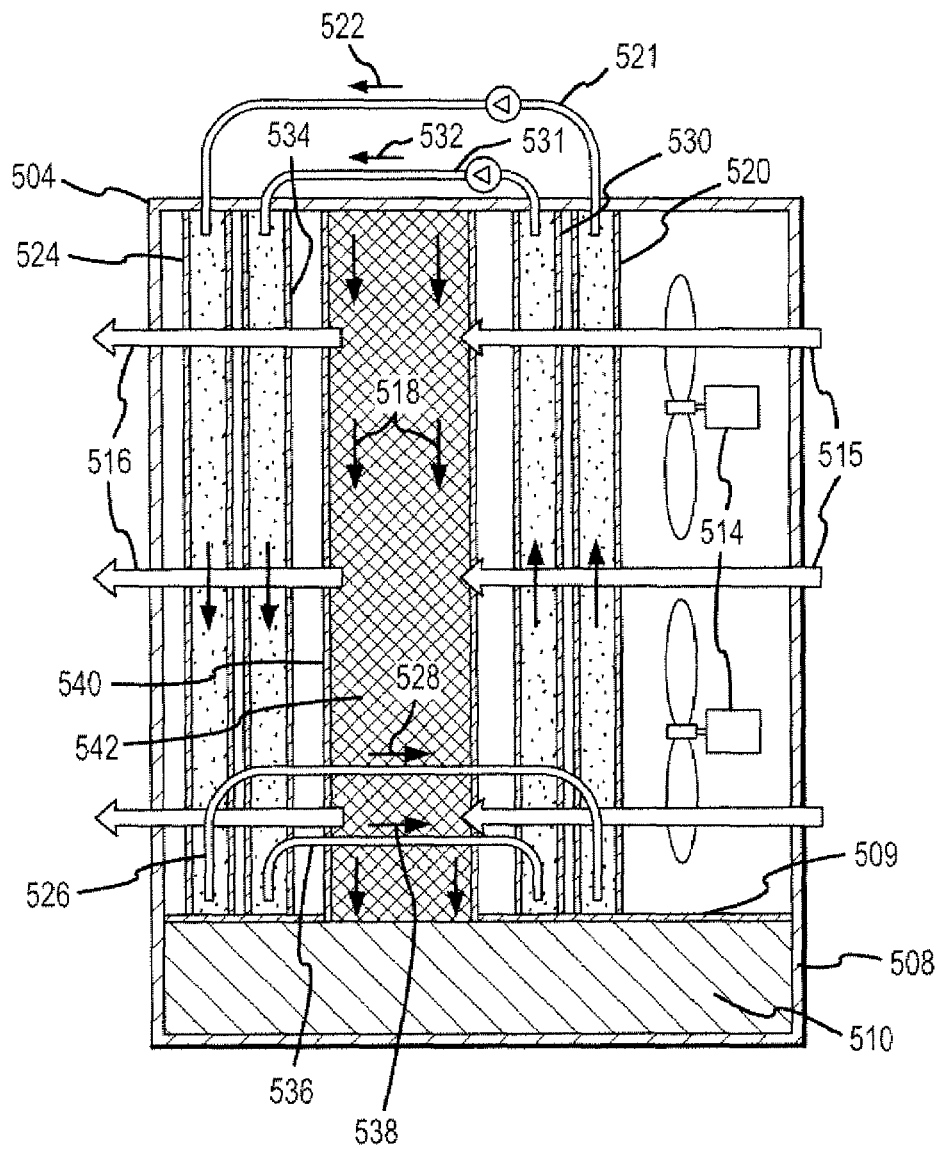
FIG. 5 is a sectional side view of another embodiment of an evaporative chiller of the present invention that may be used in cooling systems such as the system of FIG. 1.
Figure 6:
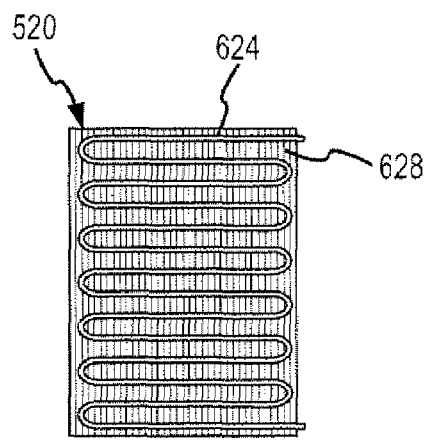
FIG. 6 illustrates an end view of a fin and tube heat exchanger useful in the chiller of FIG. 5 for providing efficient air-to-liquid and liquid-to-air heat transfer while maintaining gradient chilling.

With reference to FIGS. 3A and 3B, the gradient is the result of the psychometrics changing from the top to the bottom of the chiller 200. FIG. 3A provides a graph 300 of a hypothetical example of the psychometrics of the air flowing at or near the top of the chiller 200. FIG. 3B provides a graph 310 of a hypothetical example of the psychometrics of the air flowing at the bottom of the chiller 200. In the graphs 300 and 310, ambient air enters the chiller at point A such as at 100° F. and 15 percent humidity in the illustrated example (with it being understood that the particular operating conditions will vary widely while the overarching concepts are applicable in many inlet or ambient air conditions). The air is cooled indirectly or without moisture addition from point A to point B as it passes through the thermal storage matrix between the chiller air inlet and the saturator inlet (or in an air-to-air heat exchanger or other heat exchanger configuration in other embodiments of the invention). The air is then passed through the saturator as shown from point B to point C in FIGS. 3A and 3B where it gains moisture and its relative humidity increases to 85 percent. The air also gains enthalpy in the saturator from the water stream as is shown by the upward slope of the line between points B and C. The air is used to pre-cool incoming air or a second thermal storage matrix (or liquid in a heat exchanger as shown in FIGS. 5 and 6) as it is passed out of the chiller, and the psychometric effects are shown from point C to point D where the air gains heat or enthalpy from the incoming airstream, which is being pre-cooled to a lower temperature. In operation of a chiller, water at the top of the saturator has higher enthalpy than at the bottom, and this can be seen as the line from point B to point C having a steeper slope in graph 300 compared with the line from point B to point C in graph 310.

At equilibrium, a gradient is established such that the airstreams (and, therefore, the water in the saturator) reach lower temperatures at the bottom of the chiller than at the top of the chiller (e.g., 59° F. versus 64° F., respectively, as shown in the example of FIGS. 3A and 3B). The overall outcome of providing gradient chilling in the chillers of the invention is that lower temperatures for the output chilled water are achieved by the chillers in a single pass of the water through the saturator than in chillers that do not include such gradient chilling. As will be appreciated, lower temperatures of the pre-cooled air at the saturator inlet and the resulting lower temperatures of the output chilled water expand the number of days and the geographical range for which chillers such as those described herein may be used to satisfy all or much of the cooling load for a particular application, building, or interior space. In the use of storage matrices as shown in FIGS. 2A and 2B, as the airstream is cooled, it will experience the coldest media on the side of the bank or matrix proximate to the saturator, thereby effecting a counter-current-like heat exchange. The gradient chilling is achieved because as the warmer water enters the top of the saturator, a vertical temperature gradient is set up in the saturator and in the thermal storage banks or matrices such that the coldest temperatures of both will be at or near the bottom of the chiller (e.g., as viewed with a vertical cross section of such components).

The saturators used in the chillers of the present invention may be of the types found in conventional evaporative coolers or use similar pads, packing, or other materials over and through which air and water flow (e.g., in a cross or transverse pattern as discussed above). For example, the saturator may use aspen fibers or other similar materials and/or use a rigid medium. Generally, any material giving ample surface area, good wetability properties, and relatively easy passage of air may be suitable for use in the saturator. During operation, water from an insulated sump or from a return line from a building or interior space heat exchanger is pumped to the top of the media and dispersed to thoroughly wet the saturator media. Water flows down through the saturator typically unaided under the effect of gravity. The functional goal is to saturate the airstreams flowing through this media in the saturator with water as completely as practical (e.g., up to about 85 percent relative humidity or more in some cases) as the air passes through the saturator. The saturator media, pads, or packing are selected and arranged to reduce the rate of downward flow of the water being chilled and also to disperse the flow such as into small channels or droplets so as to increase the time the water spends exposed to cooling air and the surface area of the water available for evaporation. In theory, the water in the saturator may simply be dripped downward from a top to a bottom of a saturator without or with little media, pads, or packing being utilized. It is generally preferred that a relatively small amount of non-evaporated water be carried from the saturator (e.g., into the thermal storage matrices) by the airstream or by capillary action. Hence, in some embodiments, a space or gap and/or a screen/filter are provided between the saturator and a heat exchanger such as a thermal storage matrix. In any case, it is typically useful to include a water level control device in the chiller or the associated cooling system, such as a float-based refill mechanism, float valve, or the like, to replenish water periodically to account for evaporation and other losses of water from the chiller and/or cooling system.

Again, suitable material for use in the saturator may be the same as is used in conventional evaporative coolers and may include, but is not limited to, wood or paper fibers, wood, plastic, ceramic or metal media such as a honeycomb arrangement, particles, or the like, plastic mesh, glass fibers, metal fibers, or any other useful material. In the thermal storage matrix embodiments, the saturator may include media similar or the same as used in the storage matrices. The storage material or media preferably is chosen to provide sufficient thermal storing capacity and to have rapid thermal conduction or heat transfer from its surfaces that contact the air to its internal or subsurface mass but yet provide relatively non-restrictive flow paths for (e.g., to be permeable to) the air flowing through the matrix or bank so as to not create an unacceptable pressure drop or to require high power or large fans. In some preferred embodiments, high efficiency heat transfer is achieved with relatively thin matrices (i.e., the air flow path across the matrix is short because the matrix is less than about 3 feet thick and more typically less than about 1 foot thick). In the preferred embodiments, the pressure drop is not significant (e.g., less than about 0.4 inches WC for each bank and more typically less than about 0.2 inches WC) so as to not add unacceptable fan energy and capital costs (e.g., require larger, more expensive fans).

As discussed, a wide variety of materials may be used for the media or material in the thermal storage matrices. Examples include stone (e.g., gravel, rocks, pebbles, or some combination thereof), glass, metals including aluminum, steel, and the like, plastics, wood, and concrete. The material may be provided in a number of forms, such as particles that when placed in a column or array provide air gaps, but in some cases the material may be provided as one or more larger pieces with air paths provided such as honeycomb or porous blocks or chunks (e.g., a cast block with perforations). When particles are used, the geometry of these storage media particles may also widely vary and may include any one or more than one of the following: spherical shapes; irregular shapes (e.g., aggregate, rocks, or the like); toroidal shapes; strip shapes (e.g., shredded material such as shreds of plastic or metal); fibers or fibrous shapes; and complex shapes. Materials and configurations that create convoluted air flow paths may in some cases be desirable to increase thermal transfer efficiency. The material may be chosen to control fabrication costs, for its ready availability, and because it exhibits a good ratio of heat capacity to mass. To further increase heat capacity, an alternative would be to use encapsulated phase change material (e.g., material that changes between liquid and solid phases at a temperature within the range normally experienced by the material in storage matrices). The thermal storage banks may be uniform in the distribution and/or density of the storage media and in their cross section or they may be varied across one or more cross sections. For example, it may be useful to have the bank be thicker in certain portions to obtain a desired heat transfer or it may be useful to vary particle sizes in some areas or otherwise provide smaller air passages in some portions (such as directly in front of the fans) to balance air flow (e.g., with larger passages or less dense material packing provided more distal to the fans or their centerline or central axis). Rather than rectangular, the storage banks may be "V", "W", "S", or otherwise configured in cross section so as to allow a greater area for air flow. Spacing of loose objects or particles such as pebbles or metal/plastic/glass spheres or the like may be controlled by selecting differing object sizes and/or interleaving plastic or wire mesh in the matrix or bank.

Figure 4:
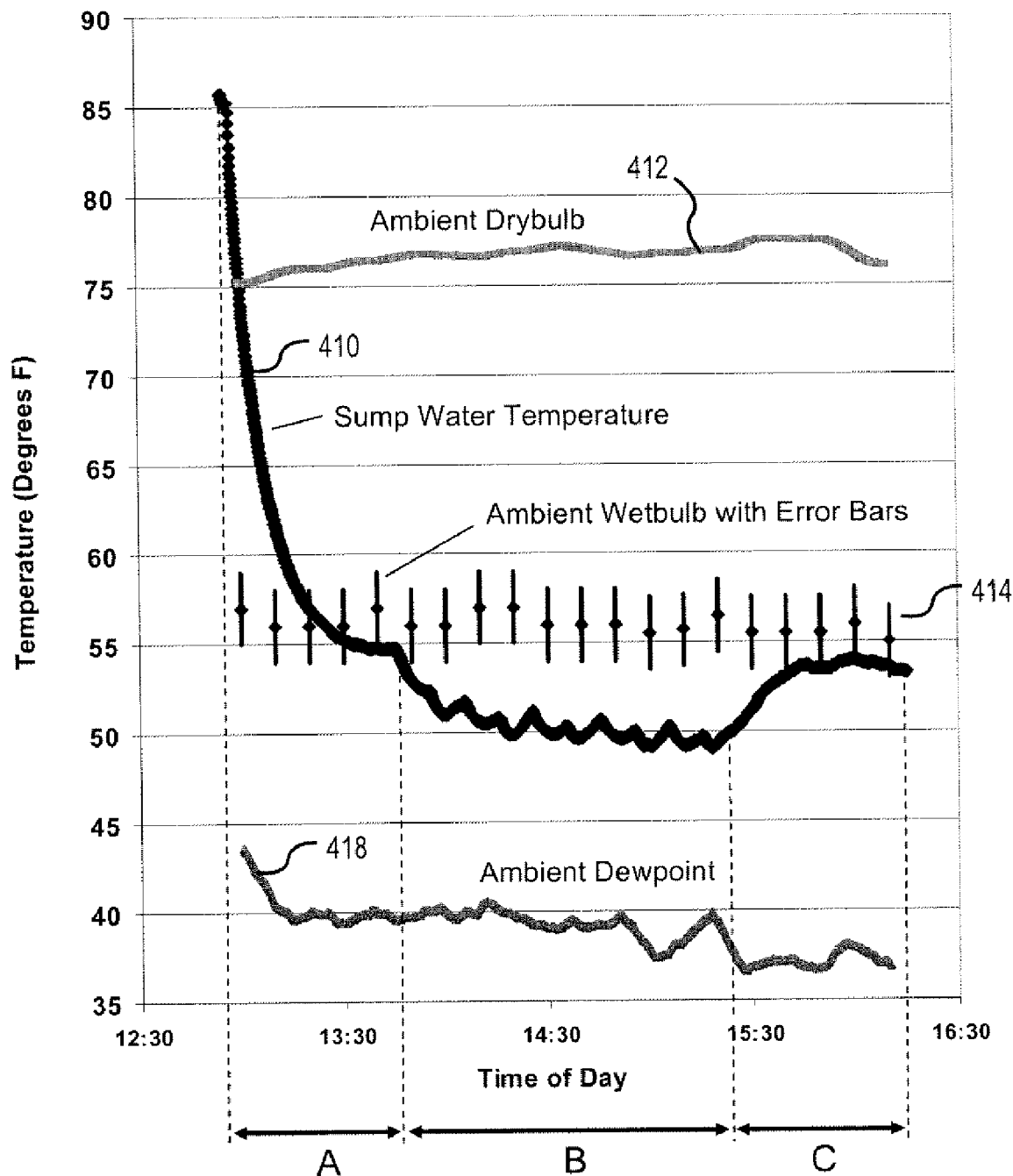
FIG. 4 is a graph illustrating results of operation of the chiller of FIGS. 2A and 2B under one set of operating conditions and one exemplary chiller configuration including a particular storage matrix material or filler used for storing "coolage" (i.e., being placed at a temperature below ambient) for use in pre-cooling inlet air flow.

An implementation or embodiment of the chiller 200 was constructed and tested. A cabinet was constructed of wood and 0.5 inch foil-faced foam insulation to create an interior chamber (with open ends) measuring 17.5 inches high by 15.5 inches deep and an overall length of about 5 feet. Storage banks were constructed at either end using metal supports and wire mesh (hardware cloth) to contain the heat storage media, which consisted of highly irregularly shaped gravel (stones) with average diameters of about 0.5 inch. Spacing between the stones was increased by layering the gravel on sheets of wire mesh such that the overall density of the storage banks was approximately 52 pounds of stone per cubic foot. A 14 inch reversible fan in a shroud was placed to the right of the left-hand storage bank. A saturator was placed between the fan and the right-hand storage bank with dimensions 17.5 inches high by 15.5 inches deep by 3.5 inches wide and composed of layers of commercial plastic swamp cooler pads. Water was pumped from a sump beneath the saturator and delivered across the top of the saturator using tubing with perforations at a delivery rate of about 2.5 gallons per minute. The fan moved air through the device at an average rate of about 160 cubic feet per minute. Dimensions and rates of water and air flow were not optimized. The graph 400 of FIG. 4 illustrates results of a sample run for this particular embodiment of the chiller 200. Line 410 illustrates the sump water temperature over the course of the experiment. Line 412 illustrates the dry bulb temperature of the ambient air available at the air inlet of the chiller 200. The wet bulb temperature of the ambient air is shown at 414 along with error bars. Also, line 418 is included to show the dewpoint of the ambient air. At the start of the test run, the sump was filled with 6 gallons of warm water (at approximately 85° F.), the recirculating pump was started, and the fan was run in one direction for the time period shown as period A. The temperature of the sump water 410, which was being recirculated through the saturator without having its enthalpy increased in a building heat exchanger as would be typical, reached a steady state at approximately 55° F. This temperature of the sump water was approximately the wet bulb temperature of the ambient air as shown as an overlap of 414 and line 410 in period A, and represents what can be achieved at equilibrium without pre-cooling the inlet air to the saturator. During period B, the fan direction was cycled periodically (e.g., a 10-minute cycling period in this case) to run in opposite or alternating directions. For example, at the beginning of period B, the fan was run in a direction opposite that used in initialization period A, and after 10 minutes, the fan direction was reversed, with this process then being repeated. As shown with line 410, the temperature of the sump water dropped approximately 5° F. or to below the temperature achieved using only ambient air (i.e., the outlet water of the saturator was dropped below the wet bulb temperature of the ambient air by about 5° F.). In time period C, the fan was again fixed in one direction, and, as a result, the sump water temperature 410 returned to about the wet bulb temperature of the ambient air. The test run illustrated with graph 400 clearly demonstrates the effectiveness of chillers with the design of chiller 200 of FIG. 2 for achieving sub-wet bulb temperature chilling using thermal storage matrices in the air inlet and outlet of a saturator, with cross-flow of the air through the saturator.

There are numerous other techniques for pre-cooling the incoming air using the exiting air. FIG. 5 illustrates another chiller 500 of the present invention that provides an air-fluid-air heat exchanger configuration to achieve pre-cooling. As shown, the chiller 500 includes a frame or structure 504 with a sump 508 with an upper plate 509 for storing chilled water 510 for use in a cooling system (such as a building or interior space heat exchanger as shown in FIG. 1). The frame or structure 504 is adapted with air inlets on a first side for allowing ambient air 515 to be drawn into the chiller interior by operation of one or more fans or blowers 514. The air passes through side walls 540 of a saturator and the saturator medium 542 (e.g., one or more pads or the like) to chill the water 518 flowing downward through the medium 542, and then the air 516 exits the second or opposite side of the chiller structure 504.

To pre-cool the incoming air 515, the chiller 500 includes an air-to-fluid heat exchanger that is positioned upstream of the saturator inlet. The upstream exchanger includes, in this embodiment, a pair of finned-tube heat exchangers 520 and 530 with an example shown in FIG. 6 to include a serpentine tube 624 for containing a liquid such as water or the like and fins 628 attached to the tubes 624 to enhance heat transfer rates between the air 515 and the tubes 624 and the liquid contained therein. The upstream exchangers 520, 530 contain water or other liquid at a temperature below the ambient air temperature, and as a result, the air entering the saturator wall 540 (e.g., its air inlet) is below the ambient air temperature. At the air outlet of the saturator, air exiting the saturator 516, which is cooler due to evaporation in the saturator medium 542, is used to lower the temperature of the liquid in upstream heat exchangers 520, 530. This is achieved by routing the liquid 528, 538 used for pre-cooling in exchangers 520, 530 as shown at 522, 532 to the downstream or outlet exchangers 524, 534 via piping 521, 531 (which may also include pumps), and cooled water 528, 538 is then returned to the inlet exchangers 520, 530 via piping 526, 536. The outlet exchangers 524, 534 may be configured as finned-tube heat exchangers as shown for exchanger 520 in FIG. 6 to provide increased heat transfer area for liquid-to-air heat transfer between the liquid in the exchangers 524, 534 and the exiting air 516. Two exchangers are shown at both the air inlet and the air outlet of the saturator, but one or more exchangers may be used at one or both of these positions.

In this manner, the heat exchange between the incoming and outgoing airstreams 515, 516 is effected by using a combination of air-to-fluid and fluid-to-air heat exchangers. As shown in the chiller shown in FIG. 5, heat in the liquid 522, 532 can be pumped from one side of the saturator to the other using, for example, finned heat exchange units 520, 524, 530, 534. Such units, which are well know in the HVAC arts, can be fabricated from metal fins (e.g., aluminum or the like) attached to metallic tubes (such as copper or other metal tubes). Additionally, the pre-cooling may be achieved with many other air-to-fluid heat exchanger designs, which are considered within the breadth of this description, for achieving high surface area and heat conduction with the air and/or fluid/liquid streams. The liquid or heat transfer fluid may be water, a glycol solution, or any other suitable heat transfer fluid. As shown, the fluid is pumped downward in the air outlet exchangers 524, 534. The fluid is chilled in these heat exchangers 524, 534 by contact with the exiting airstream 516 from the saturator. The fluid is then piped to heat exchangers 520, 530 upstream of the air inlet to the saturator. The cold fluid 528, 538 enters at these exchangers 520, 530 at their bottom (or lower vertical portion) and is warmed as it is pumped upward toward the top or higher vertical portion of the exchangers 520, 530 due to heat transfer from the incoming air 515 to the fluid. Thus, the air entering the saturator is pre-cooled, and the air entering at the bottom of the saturator will be cooler than air entering at the top of the saturator because it contacts the cooler fluid in the exchangers 520, 530. This not only provides the desired pre-cooling of the incoming air 515 to a temperature below the ambient air temperature but also maintains the desired gradient chilling in the chiller 500. The chiller 500 optionally includes multiple inlet and outlet heat exchangers, and as discussed with reference to chiller 200, the saturator pad or filler 542 is selected to be a material, a configuration, and size to provide adequate surface area to achieve a desired level of chilling/evaporation of the chilled water 510. The chiller 500 is designed to provide compact unit dimensions and relatively low pressure drops for the fans 514. Saturation of the airstream 515 in the saturator may be enhanced by introducing makeup water using misters placed upstream of the air inlet of the saturator.

Rather than air-to-fluid or air-to-storage matrices, the pre-cooling may be achieved with an air-to-air heat exchanger positioned in the chiller cabinet generally upstream of the saturator. For example, the chiller 700 of FIG. 7 utilizes a plurality of tubes to define channels or pathways for incoming air 718 and outgoing air 750 from the chiller to cause the two air streams to flow in a counter-current manner and to achieve cross-current flow of the air and water in the saturator 730. As shown, the chiller 700 includes a frame or cabinet 710 that defines an interior space in which a plurality of tubes 720 (e.g., metal, thin plastic or other materials having high heat transfer coefficients) are arranged in a spaced apart manner and with their elongate axis transverse or orthogonal to the vertical axis or plane of the chiller 700. Incoming air 718 is drawn into the chiller cabinet 710 by one or more fans 714 and flows in channels or passageways 724, 728 defined by the outer surfaces of the tubes. The incoming air is cooled in layers or gradients from the top to the bottom by outgoing air 741, 743, 747 in the tubes with this air being warmer in the top tubes (such as stream 747) and cooler as it approaches the bottom of the chiller (such as streams 743 and even cooler in stream 741). The pre-cooled air 724, 728 passes through saturator medium 734 (such as one or more pads or the like) and returns at 740, 742, 746 by entering the tubes 720. Water to be chilled 761 (e.g., water with increased enthalpy from a building heat exchanger or other cooling system device) enters the top of the saturator 730 and is cooled by evaporation via contact with the pre-cooled air 724, 728, and the chilled water 762 drains by gravity to the sump 760.

Figure 7:
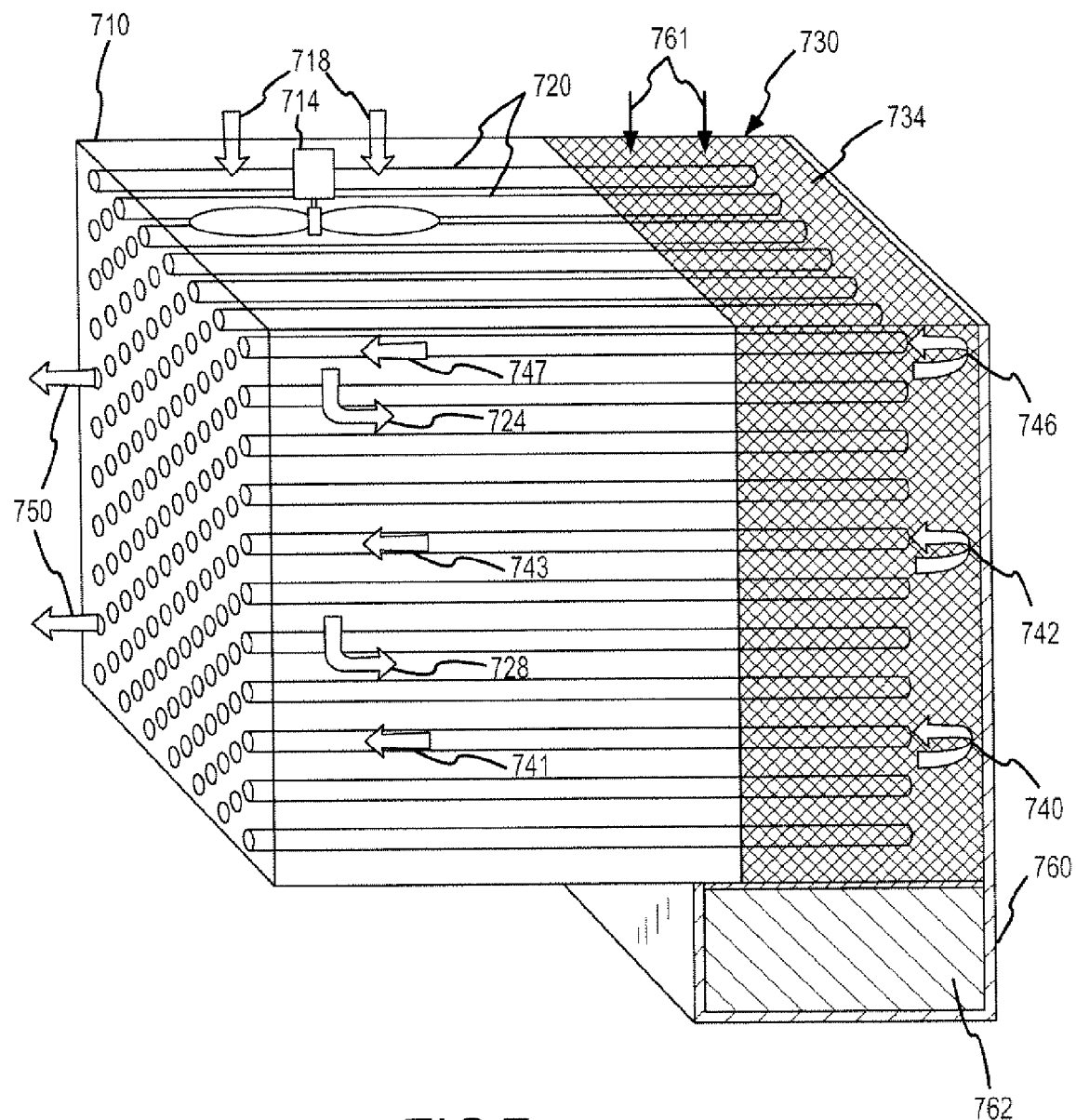
FIG. 7 is a perspective view of yet another embodiment of an evaporative chiller for use in cooling systems of the present invention with the chiller utilizing tubing for return or exiting air so as to provide an air-to-air heat exchanger that is of a tube or tube-channel configuration.

As shown, the tubes 720 are a set of parallel and relatively closely spaced tubes that allow the incoming ambient air 718 to pass between them as shown at 724, 728. The air 724, 728 gives up heat to the outgoing or exiting air 747, 743, 741 that is flowing within the tubes 720 before the air exits at 750. The saturator 730 in some embodiments is made up of material 734 interposed between the tubes 720 and/or that is provided at the end of tubes 720 where return or recirculated air 740, 742, 746 is shown in FIG. 7 as reversing its direction. Suitable material for pads, packing, filler, or the like 734 includes high wettable paper, wood fiber, plastic, or any other material that creates or provides a large surface for water flow 761 to sump 760. The tubes 720 typically are thin-wall tubes formed from plastic and more typically metal or other thermally conductive material.

Figure 8:
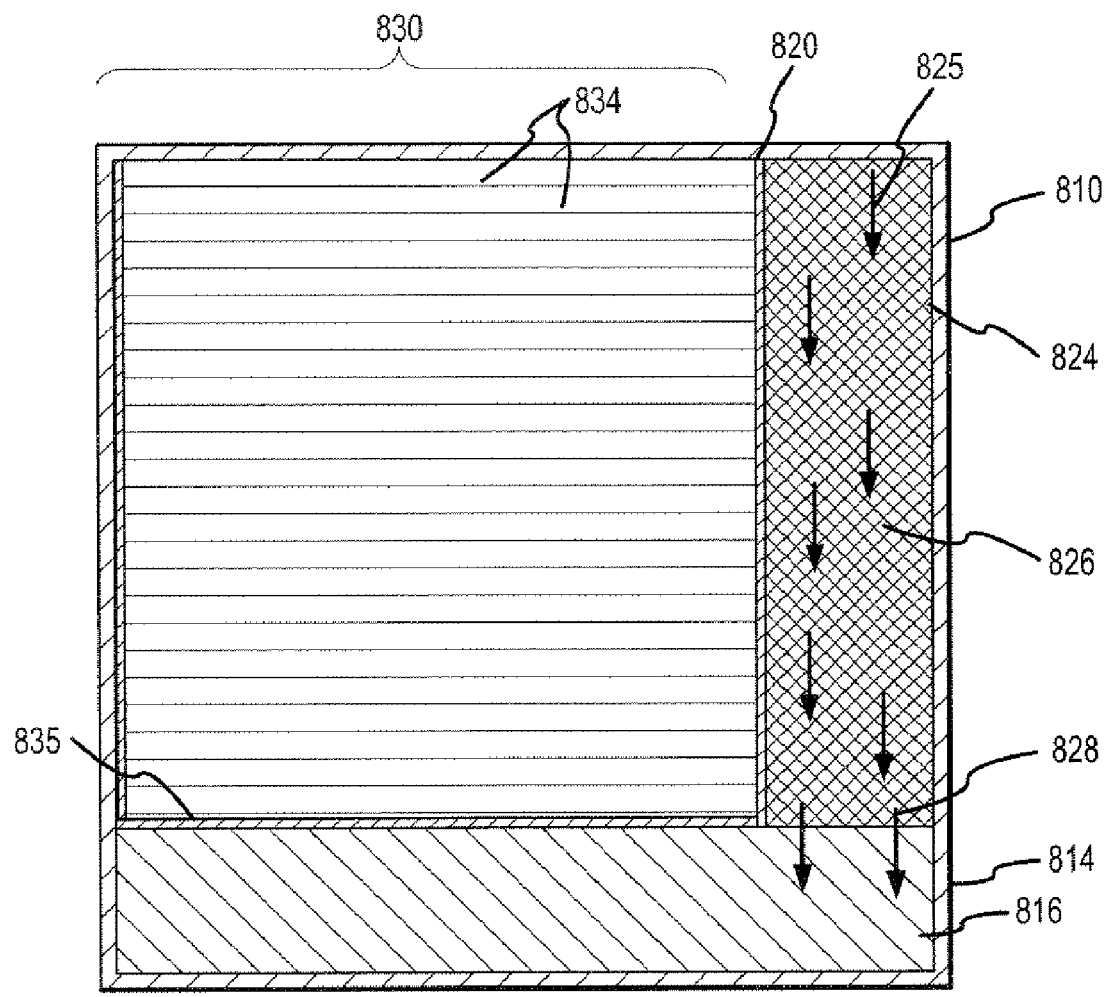
FIG. 8 is a sectional side view of an embodiment of an evaporative chiller of the invention that provides an air-to-air heat exchanger for providing pre-cooling with a plate configuration for providing flow channels for inlet and outlet/return air.
Figure 9:
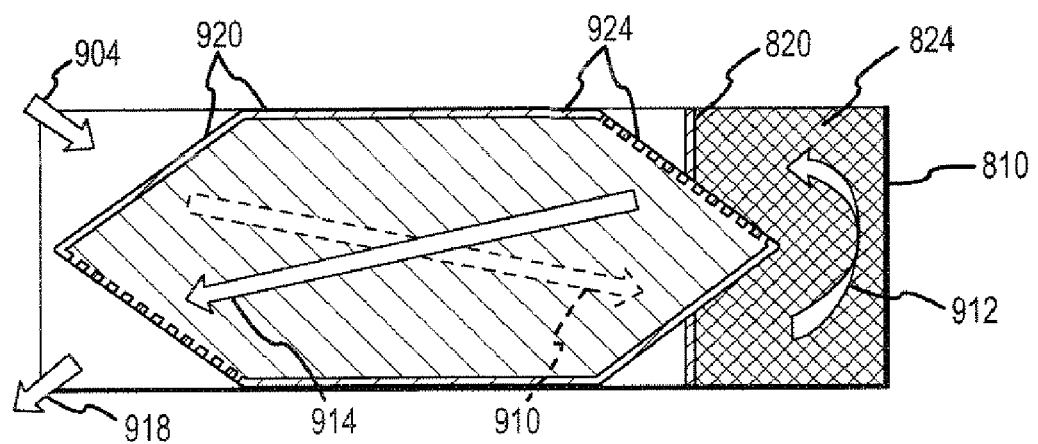
FIG. 9 is a top view of the chiller of FIG. 8 showing one exemplary, but not limiting, example of a configuration for the late air-to-air heat exchanger.

In other preferred embodiments, the pre-cooling is achieved with air-to-air heat exchangers such as plate heat exchangers or the like. FIGS. 8 and 9 illustrate side and top views, respectively, of a chiller 800 that includes a counter-current air-to-air heat exchanger 830 upstream of a saturator. Again, a cabinet or frame 810 is provided with an air inlet and air exit and a water inlet/return. As shown, the incoming air 904 enters the heat exchanger 830 at the top of the cabinet 810 and passes through the passageway adjacent the heat exchanger plates, and the outgoing air 918 exits the heat exchanger 830 at the front left of the cabinet 810. The heat exchanger 830 is shown to be made up of a plurality of horizontally extending plates 834 (e.g., thin metallic plates or other plates with relatively high heat transfer coefficients or rates). The plates 834 may be planar as shown or be textured or have a "W", "S", or other cross section to obtain additional heat transfer between incoming air 904 and outgoing air 918 from the saturator. The incoming air 904 and outgoing air 918 is caused to flow in the space or channel between alternating pairs of the plates 834 so as to allow the incoming air 904 to give up heat to the cooler outgoing air 918 as is show at 910 to represent incoming air below the top plate 834 and at 914 showing outgoing air flowing above the top plate 834. The air 910 becomes pre-cooled air or air at a temperature below the temperature of the incoming ambient air 904 and passes through the saturator media 824 as shown at 912 where it (i.e., the recirculating air) loses further heat during the evaporation process and is returned as air 914 where it is used to cool the incoming air 910. Spacers 920 and 924 are used between the plates 834 to control the flow of the incoming and outgoing air or to define the flow paths for the incoming air 904 and the recirculated air 912 such that the airstreams 910, 914 remain in adjacent and alternating airflow passages between the plates 834. Generally, the heat exchanger 830 is constructed of alternating layers of conductive "plates" 834 and spacers 920, 924. The shape of the plates 834 at the ends used to define the inlet and outlet passageways for the air 904, 918 may be triangular as shown, circular (e.g., a semi-circle or the like), or any other useful configuration for defining the air passageways (or may even include piping or the like to define an inlet and outlet manifold or similar arrangement).

The chiller 800 further includes the saturator that is defined by porous sidewalls 820 and the inner side of the frame or cabinet 810 and by the pads or saturator medium 824. Return or higher temperature water is input at the top of the saturator (e.g., through a water inlet or return pipe outlet at the top of the cabinet 810). The higher enthalpy water 825 flows by gravity through the pad or medium 824 where it contacts the pre-cooled air 912 and becomes chilled as it flows downward in the chiller from 825 to point 826 to the bottom of the saturator at 828. The medium 824 may be a single large saturator pad provided at the right end of the chiller cabinet 810 as shown or multiple pads or media may be used. Alternatively, a thinner pad or pads could be applied flush against the right end of the heat exchanger stack 830, leaving an open space for air reversal 912 at the right end of the cabinet 810. The chilled water 816 is stored in the sump 814 (or a storage tank in some cases), and the sump 814 is typically connected to a cooling system such as a residential or commercial building heat exchanger (air-to-water or the like), which results in the water increasing in enthalpy and/or temperature at which point it is returned to the top of the saturator for chilling. The use of horizontal plates 834 and the cross-flow of the air 912 relative to the water 825, 826, 828 results in the chilling gradient being maintained (as discussed in detail for other chiller embodiments). Of course, although not shown, a fan or other mechanism for forcing the air to flow through the heat exchanger and saturator would be provided in the chiller 800 such as at the air inlet or outlet or adjacent to the heat exchanger 830.

FIGS. 10-13 illustrate another embodiment of a chiller 1000 that uses an air-to-air heat exchanger to pre-cool incoming air 1015 with outgoing air 1037, 1039, 1041. The chiller 1000 includes a cabinet or frame 1010 with a solid sidewall 1012 and a sidewall 1050 with openings to allow the outgoing air 1037, 1039, 1041 to exit from its flow or return channels in the heat exchanger. One or more fans 1014 are provided at the air inlet of the cabinet 1010 to draw ambient air 1015 at the ambient air temperature and humidity. As shown in FIG. 11, the heat exchanger is achieved with side-by-side vertical plates (e.g., heat conductive metal plates) 1120 with spacers 1018 that are configured to define flow paths for the incoming air 1015 and control flow of the exiting air 1037, 1039, 1041 in layers or non-mixing gradients (with three layers being shown but two layers or more than three layers may be used). The spacers 1018 provide openings 1022, 1026, 1029 through which portions 1020, 1024, 1028 of the incoming air 1015 flow in the channels or passageways 1110 between the plates 1120.

This pre-cooled air in channels 1110 reverses direction 1036, 1038, 1040 and flows through saturator pads or media 1030 that is positioned between the plates 1120 at one end of the outgoing air passages or passageways/channels 1030

Figure 12:
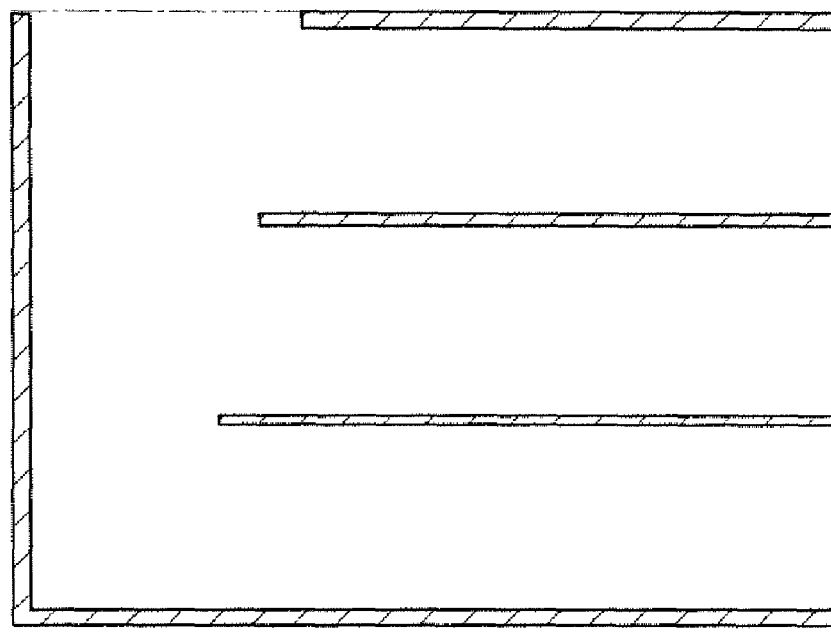
FIGS. 12 and 13 illustrate exemplary spacer designs for use with the chiller of FIGS. 10 and 11.
Figure 13:
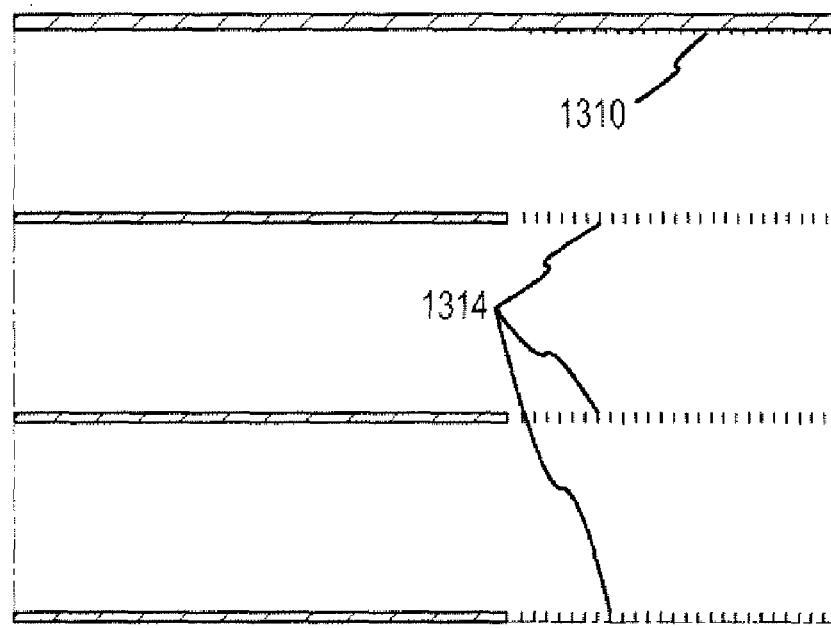

(with an opening or space typically provided between the end of the incoming air passage 1110 and the wall 1012). The frame 1010 further includes front and back sidewalls 1102, 1104. Incoming water 1034 enters the chiller at the top of the saturator pads 1030 and is cooled by evaporation of water in the pre-cooled air 1036, 1038, 1040 before it is returned to the sump 1060 as chilled water 1062 (e.g., water at or near the wet bulb temperature of the pre-cooled air 1036, 1038, 1040 (such as at or near the wet bulb temperature of the air 1036 due to gradient chilling in the saturator)). FIGS. 12 and 13 illustrate a representative spacer assembly 1200 for defining incoming air passages and a representative spacer assembly 1300 for defining outgoing passages. A water distribution pipe 1310 is include in the outgoing spacer assembly 1300 as are perforations 1314 for water flow at one end (e.g., the saturator end) for water flowing in the saturator pad(s).

In the chiller 1000 the incoming airstream is pre-cooled by passing counter-current to the outgoing airstream in a flat or other cross section plate-based air-to-air heat exchanger positioned upstream of the saturator. As shown in FIGS. 10 and 11, vertical and parallel sheets of thin, conductive material are used to separate the incoming and outgoing airstreams but place them in adjacent heat transfer passages or channels. Several layers of alternating incoming and outgoing passages are employed in most preferred embodiments. These heat transfer sheets or heat exchange plates are separated using spacers such as those shown in FIGS. 11-13 in alternating layers of spacers. A fan is placed at the top of the unit to force ambient air down between the plates as shown. This air then passes to the right (in this example) until it reaches an open chamber at the right end of the device or cabinet in which the air can reverse direction to flow and enter the outgoing passages. In the outgoing passages, material or saturator media is placed that is wetted during operation of the chiller 1000 by a vertically flowing stream of water (e.g., this portion of the chiller is considered the saturator). This may take the form of water passing down the walls of the heat exchanger passages but more typically includes some wettable material that is interposed between the walls or in the outgoing or return air passages.

For example, a zigzag shaped, thin, wettable "pad" could be used as shown in FIG. 11. The saturator material preferably does not occupy a significant amount of the passage space to control pressure drop of the pre-cooled air but is adequate to allow sufficient saturation of the passing air with water. The heated water from the building interior is typically pumped to the top of the saturator pads by a pump (not shown) and flows downward over the pads by the force of gravity. Below the saturator, an insulated sump is provided for receiving and storing the draining chilled water. The airstream then exits at the left-hand side of the device as shown in this example. The number of heat exchange plates and the dimensions of the passages may be varied to practice the invention, and may be determined to obtain a desired efficiency of heat transfer, to suit fan power limits, and to control or based on fabrication costs. Air and water flows are typically determined by the amount of cooling (e.g., desired tonnage) required and anticipated temperature differentials where the chiller is installed for use. The surface area of the saturator pads preferably is sufficient to accommodate the required total water flow while maintaining thin film flow over the surfaces. The saturator pads can occupy the full length of the outgoing air passages in some embodiments or, as shown, only a portion on one side/end of the passage. Water can be distributed evenly along the tops of the saturator pads or unevenly (e.g., a higher flow rate may be desirable on the end of the saturator pads nearer the inlet to the pre-cooled air into the saturator region of the chiller). A mechanism may also be provided to maintain the water level in the sump, such as a float valve that allows water to be added or to flow into the sump when the level drops below a preset level. Additionally, an anti-scale filter on the incoming fresh water or fill water may be useful in some implementations. For added saturation of the airstream, the water entering the saturator may be introduced using misters or fill water entering the sump may be added by spraying with misters or the like in the opening or gap at the edge of the cabinet between the pads and the cabinet end or side wall.

Fabrication of the chiller 1000 involves engineering different spacer sets such as those shown in FIGS. 12 and 13 for the incoming and outgoing air channels/passageways. The heat exchanger stack is composed of alternating layers of spacers and plates. The heat exchanger plates or material is typically thin and formed of thermally conductive materials such as metal but plastic and other materials may be used. The sheets may be relatively rigid or can be formed from thin relatively flexible material that is pulled or tensioned to be taught or planar. The spacers can be formed from metal, plastic, foam, rubber, wood, or other materials. To ease fabrication and provide support, the "open" regions of spacer sets may also be of material but configured with perforations or an open, corrugated, or honeycomb design to allow air to flow through. The saturators may be made of a material such as wood or paper fibers, plastic mesh, fabric, glass fibers, metal fibers, a honeycomb arrangement of such materials, or the like and preferably is configured to be highly wettable. Note, in the chiller 1000 and similar designs, the gradient chilling effect is maintained by the horizontal partitions included in the spacer configurations shown in FIGS. 10-13, and the spacers are preferably formed of a nonporous material and are arranged to block or limit vertical mixing (i.e., maintain temperature stratification) of both the incoming and outgoing air such that the incoming ambient air is effectively and efficiently pre-cooled by the outgoing, cooler air.

The complete assembly of the heat exchanger and saturator (and sump) is preferably located within some type of cabinet or frame such as metal, plastic, wood, or the like sheets, walls, and support structures. The cabinet provides improved aesthetics for the chiller for use near commercial and residential buildings and also protects the heat exchanger from damage from elements or the like. In addition, the cabinet helps to seal the edges of the heat exchanger and the chamber at the side or end of the saturator to prevent or limit air leakage that may bypass the saturator or pre-cooling heat exchanger. Preferred dimensions of the cabinet are such that the chiller 1000 can be mounted against or adjacent an exterior building wall while not protruding very far outward. For example, a 3-ton (or 36,000 BTU/hour) chiller could theoretically be housed in a cabinet measuring less than 5 feet wide by 6 feet tall by 2 feet deep. These dimensions allow the chiller to be mounted up against the side of a building of a residence or a commercial building, even in areas with small setbacks from property lines. Because the outer facing side of the cabinet (e.g., one of the larger side walls rather than the smaller end walls or the top/roof) has no air inlets or outlets, it is sometimes covered with material such as siding to match the facade of the adjacent building.

In other embodiments of the invention, a heat exchanger that interleaves the incoming and outgoing airstreams in a spiral, counter-current configuration is utilized to achieve pre-cooling of the incoming airstream and to maintain a chilling gradient. One useful embodiment of such a chiller 1400 is shown in FIGS. 14A and 14B in top and side views, respectively. The chiller 1400 includes a cabinet or frame 1410 in which a fan 1412 is provided to draw ambient air 1414 into the cabinet 1410 and to force the air 1414 into an inlet channel or passageway 1418 for incoming, ambient temperature air. Two sheets 1416, 1420 of metal or other thermally conductive materials are used to define the inlet passageway 1418 and an adjacent outlet channel or passageway 1422 for outgoing air 1448 that has passed through the saturator media, pad, or the like 1434 retained by a saturator side wall 1430 (e.g., the saturator of the chiller 1410). In FIGS. 14A and 14B, spiral solid and dashed lines are used to indicate the two interleaved sheets of heat exchange material with arrows provided to indicate direction of air movement in the chiller 1400.

The sheets 1416, 1420 are arranged to create side-by-side spiral paths for the airstreams 1414, 1448 to provide countercurrent heat transfer between the two airstreams 1414, 1448 to pre-cool the air 1414 prior to its reaching the saturator pad 1434 at 1438. The pre-cooled air 1438 passes through the saturator pad 1434 where it contacts water that is input at 1456 at the top of the chiller 1400 such as via a mister, sprayer, or drip line or the like and chills the water 1470 via evaporation. The chilled water 1464 is stored in a sump 1460 at the bottom of the cabinet 1410 (and/or in an insulated storage tank (not shown)). A pump 1450 may be used to recirculate the water 1464 via the return piping 1452 to the saturator at 1456 and/or to another heat exchanger such as an air-to-fluid exchanger used to cool a residence or commercial space (as shown in FIG. 1). The air 1438, 1440 in the saturator is cross-flow (e.g., transverse or orthogonal) to the vertical flow of the water 1456, 1470 and is allowed to enter and exit along the entire or most of the sides of the saturator wall 1430. Gradient chilling is maintained by minimizing vertical mixing in the heat exchanger, an effect that can be enhanced by interposing one or more sets of horizontal spacers 1458 between the sheets.

More generally, the spiral formed by the sheets 1416, 1420 may be circular, ovoid, or other configurations to define desirable adjacent flow paths for the two airstreams, with one exemplary but not limiting configuration being shown in FIGS. 14A and 14B. The material of construction for the heat exchanger is chosen to allow efficient conduction of heat from one channel to the other, and some preferred materials include thin sheet metal such as steel, aluminum, or copper, thin plastic sheeting, or other materials. The thickness of the sheets or separating/heat transfer walls of the heat exchanger should be such that it provides adequate structural support to the heat exchanger while conducting heat rapidly between the airstreams. The dimensions (width and height) of the airflow channels and the number of turns of the spiral (e.g., length of the pre-cooling run) may vary to practice the invention and can be chosen to match or suit the fan or to obtain a desired flow with a selected fan(s) and/or to obtain particular heat transfer properties.

In some embodiments, the heat exchanger spiral is composed of multiple channels rather than one inlet and one outlet channels as shown in FIGS. 14A and 14B. For example, embodiments with two or more channels for incoming air and for outgoing air may be useful in some implementations to achieve higher air flow and are considered within the breadth of this disclosure. The inlets of all embodiments of the invention may utilize one fan as shown in the figures such as by clustering the inlets in multi-channel embodiments. The outgoing air may be vented along a vertical side wall of the cabinet or otherwise such as vertically out of the heat exchanger and out the top or roof of the cabinet (e.g., an exhaust stack or vent pipe).

Located at the center or core of the heat exchanger and chiller is the saturator 1434 through which the water stream that is being cooled passes. The pre-cooled air enters the core on one side and exits on the opposite side or in another region of the core. The water stream enters at or near the top of the saturator, flows downward under the force of gravity, and drains out the bottom into a sump. The sump is typically insulated so that the chilled water does not as quickly regain heat from the outside environment around the chiller cabinet. The water flowing through the core region is broken down into smaller channels or droplets to increase the surface area available for evaporation. This can be facilitated by using media as in traditional evaporative coolers and as described above for other embodiments. Such media could include but is not limited to wood or paper fibers, plastic mesh, glass fibers, metal fibers, and any other materials useful for saturator media. Alternatively, or in addition to such media, the water can be broken into droplets using sprinkler heads, misters, atomizers, motorized blades, or other mechanisms. Such water delivery devices could be located only in the core as shown or also in the outgoing channel of the air-to-air heat exchanger to further facilitate indirect cooling of the incoming airstream.

The water stream introduced into the core or saturator is cooled by evaporative cooling via the pre-cooled air stream that is flowing cross-current (or transverse) and then drains into the sump located below the core or saturator. The water is moved through the chiller via a recirculating pump or pumps. The air flow through the spiral heat exchanger and saturator is maintained by a fan or fans located at any useful position within or outside the chiller cabinet. In one embodiment, the fan is located at the point where the outside ambient air enters the heat exchanger as is shown in the figures. As with other chiller designs, a mechanism typically would be provided to maintain the water volume in the chiller or sump such as a float valve that allows fresh water to flow into the sump when the level drops below a preset point. Also, an anti-scale filter may be provided to filter incoming water to limit scaling.

The complete chiller assembly may be positioned within some type of cabinet with walls (e.g., metal, plastic, wood, or other material) that physically support and protect the heat exchanger and saturator and increase its aesthetic appeal. The cabinet may also be designed to "seal" the heat exchanger, saturator, and sump such that air generally does not leak in or out to bypass the heat exchanger or saturator. The cabinet may take numerous shapes and sizes to practice the invention such as cylindrical, oval, rectangular, or other cross sectional shapes with dimensions selected to suit the size and shape of the heat exchanger, fan, saturator, and sump.

Fabrication of the chiller may be achieved in a number of fashions. For example, long sheets of heat exchanger material with a width selected to match the "height" of the assembled exchanger are attached to a frame. Spacers with thickness selected to provide desired channel widths are interposed between the sheets such as by attachment to the upper and/or lower edge of the sheets. Spacer material is desired to be resilient so as to maintain the spacing and to block air flow but yet be bendable for assembly. Hence, a rubber, closed-cell foam, or similar material may be used for the spacers. The sheets are then rolled up such that the spacers maintain the spacing between the sheets, and the ends of the sheets are then secured to the cabinet or a structure within the cabinet at their edges. The frame may be used to support the saturator materials or pads and/or in some cases, the frame is replaced with a saturator or core that is designed for attachment to the sides of the heat exchanger sheets.

A modification of this assembly technique would be to use removable spacers, and in this case, the edges of the heat exchanger spiral may be embedded into a layer of material on a receptacle that holds the edges in place (for example, tar, molten plastic, cement, adhesive, or the like). The spacers can then be removed and a similar layer of material can be applied on the lid surface to hold the upper edges of the heat exchanger in place. The inventor constructed a prototype spiral heat exchanger using the former construction techniques, and effective heat transfer between the incoming and outgoing air streams was successfully demonstrated.

Fabrication of other chillers such as those with thermal storage matrices as shown in FIGS. 2A and 2B may also be completed relatively inexpensively and without high assembly costs. For example, the chiller 200 may use cabinet dimensions and shapes as discussed for the cabinet of chiller 1000 or other chillers discussed herein. However, the fabrication would be less complicated because no complex heat exchanger is used, which results in lower costs of construction. The cabinet 204 may be designed to accept or receive modular units or components. For example, a cabinet 204 may be designed to receive four modular components including two thermal storage banks or matrices, one set of fans, and one saturator unit. The storage banks may also be constructed simply as "cages" that are filled with the storage media 222, 226 or with cast blocks with perforations or other storage bank configurations. Maintenance of the chiller 200 would be minimal and may include seasonal draining, rinsing of dust and dirt from the storage banks 220, 224, and occasional replacement of the saturator media or pads 216.

For all six designs, the efficiency of cooling of the chilled water is very high. The only electrical requirements are for the relatively low power fan(s), one or two small pumps, and control circuits. Further, in some residential and smaller commercial embodiments, the movement of the water from the sump to the top of the saturators is achieved using a small recirculation pump (submersible in the sump or non-submersible located adjacent to the sump). As described for the system 100 of FIG. 1 above, one pump could be used to move water into the building with the return water entering the device at the top of the saturator or two or more separate pumps could be used. The total electricity usage is very low relative to compressor-based air conditioning, resulting in higher EER or SEER ratings than conventional A/C systems. Each chiller of the invention is designed to chill water to below the ambient wet-bulb temperature. Each chiller also establishes a gradient such that the coolest air and water temperatures are found at the bottom of the cooler (i.e., the gradient chilling principle). Each of these chillers also can be designed to fit inside a cabinet that integrates well with a residential or commercial building, perhaps having a depth of two feet or less.

The chiller embodiments of the invention are also compatible with chilled water storage. In one embodiment, this is achieved by increasing the volume of the sump; i.e., the chiller is placed over an underground, insulated tank into which the chilled water can flow. A volume of several hundred or thousands of gallons, depending on the application, allows storage of substantial cooling power for use during the hottest parts of the day. This could defer electric loads to off-peak (e.g., nighttime and morning) hours and/or allow the equipment to be down-sized so that the chiller runs for a large fraction of the day even though cooling may only be required during a small fraction of the day. This application also benefits from the use of cooler nighttime ambient dry bulb and wet bulb temperatures for chilling the water. Both efficiency of cooling and the temperature achieved likely benefit from the lower temperatures at night, and water usage would be lower as a result.

The chillers described are also generally compatible with backup air conditioning (A/C). One application or embodiment for using any of the chiller designs would be to have the chiller and A/C as independent systems with the thermostats set such that the A/C only comes on if the chiller system is unable to keep up with the cooling demand. An alternative application would be to pass the water stream from the chiller through a backup compressor-based chiller unit as in FIG. 1 such that the unit could further cool the water when necessary. This would eliminate the need for redundant heat exchangers in the building. The heat from the compressor unit could be dumped to ambient air, to the water stream coming from the house and going to the chiller, or to another sink. The A/C efficiency would be enhanced by using the relatively cool (e.g., around 75° F.) water stream to remove heat. Another embodiment or application for the chillers presents itself with the chilled water storage option. In this embodiments an A/C coil in the cool water storage tank further chills the water in the morning hours (for example, from 5:00 AM to 10:00 AM) when and if the chiller is unable to reach the desired tank temperature during the night. This defers the backup A/C electric load to off-peak hours as well.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. An evaporative chiller comprising:
a saturator with a liquid inlet at an upper end and a liquid outlet at a lower end, wherein a volume of cooling liquid is drained by gravity through the saturator upon being fed into the liquid inlet, the cooling liquid having a higher temperature proximate to the upper end than proximate to the lower end to provide a temperature gradient in the cooling liquid in the saturator; and means for delivering a volume of air to the saturator at a first temperature near the liquid inlet of the saturator and a second temperature near the liquid outlet of the saturator that is lower than the first temperature and wherein the air delivered to the saturator is directed to flow through the saturator transverse to a direction of flow of the cooling liquid in the saturator; and wherein the air delivering means comprises an air-to-fluid heat exchanger comprising: a first thermal storage matrix positioned along a first side of the saturator through which the air is delivered to the saturator; a second thermal storage matrix positioned along a second side of the saturator through which the air is output from the saturator after being cooled by the cooling liquid; and means for flowing a fluid through the first thermal storage matrix from a lower portion to an upper portion, from the upper portion of the first thermal storage matrix to an upper portion of the second thermal storage matrix, through the second thermal storage matrix from the upper portion to a lower portion, and from the lower portion of the second thermal storage matrix to the lower portion of the first thermal storage matrix.

2. The chiller of claim 1, wherein the air delivered to the saturator is pre-cooled relative to the temperature of ambient air adjacent a frame containing the saturator.

3. The chiller of claim 1, wherein the air delivered to the saturator is delivered through an air inlet on one side of the saturator at with a temperature gradient with lower temperatures proximate to the liquid outlet and higher temperatures proximate to the liquid inlet.

4. The chiller of claim 1, wherein the air delivering means comprises at least one fan operable at least periodically to cause the air delivered to the saturator to flow first through the first thermal storage matrix, second through the saturator, and third through the second thermal storage matrix before exiting the chiller, whereby the air is pre-cooled relative to ambient temperatures in a gradient manner by flowing through the first thermal storage matrix.

* * * * *

UNITED STATES PATENT AND TRADEMARK OFFICE
CERTIFICATE OF CORRECTION

PATENT NO. : 7,698,906 B2
APPLICATION NO. : 11/616303
DATED : April 20, 2010
INVENTOR(S) : Jarvis It is certified that error appears in the above-identified patent and that said Letters Patent is hereby corrected as shown below:

Column 8, line 23, delete "beat", and insert therefor --heat--.

Signed and Sealed this

Eighth Day of June, 2010

David J. Kappos
*Director of the United States Patent and Trademark Office*